(12) United States Patent
Six et al.

(10) Patent No.: US 8,820,064 B2
(45) Date of Patent: Sep. 2, 2014

(54) RECUPERATING PASSIVE AND ACTIVE SUSPENSION

(71) Applicant: Tenneco Automotive Operating Company Inc., Lake Forest, IL (US)

(72) Inventors: Kristoff Six, Hasselt (BE); Koen Reybrouck, Etterbeek (BE); Stefan Van Raemdonck, Belsele (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 119 days.

(21) Appl. No.: 13/660,234

(22) Filed: Oct. 25, 2012

(65) Prior Publication Data

US 2014/0116243 A1 May 1, 2014

(51) Int. Cl.
*F16D 31/02* (2006.01)

(52) U.S. Cl.
USPC ................................ 60/414; 60/416; 60/475

(58) Field of Classification Search
USPC ..................... 60/414, 416, 473, 475
See application file for complete search history.

(56) References Cited

U.S. PATENT DOCUMENTS

| | | |
|---|---|---|
| 3,917,309 A | 11/1975 | Hegel et al. |
| 4,743,046 A | 5/1988 | Schnittger |
| 5,097,419 A | 3/1992 | Lizell |
| 5,231,583 A | 7/1993 | Lizell |
| 5,682,980 A | 11/1997 | Reybrouck |
| 7,751,959 B2 | 7/2010 | Boon et al. |
| 2009/0192674 A1 | 7/2009 | Simons |
| 2011/0074123 A1 | 3/2011 | Fought et al. |
| 2011/0302914 A1* | 12/2011 | Helbling .................... 60/416 |
| 2012/0049470 A1 | 3/2012 | Rositch et al. |

FOREIGN PATENT DOCUMENTS

KR 10-2009-0059260 11/2009

OTHER PUBLICATIONS

Search Report and Written Opinion dated Jan. 9, 2014 in corresponding PCT Application No. PCT/US2013/066314 (8 pages).

\* cited by examiner

*Primary Examiner* — Michael Leslie
(74) *Attorney, Agent, or Firm* — Harness, Dickey & Pierce, P.L.C.

(57) ABSTRACT

A hydraulic actuator assembly includes an actuator, a first sink subsystem in fluid communication with an upper working chamber of the actuator, a second sink subsystem in fluid communication with a lower working chamber of the actuator and a source subsystem in fluid communication with both the upper and lower working chambers of the actuator. A low pressure accumulator is in fluid communication with the upper and lower working chambers, the first and second sink subsystems and source subsystem. A high pressure accumulator is in fluid communication with the first and second sink subsystems and the source subsystem. The hydraulic actuator assembly can generate passive or active forces with or without energy recuperation.

15 Claims, 23 Drawing Sheets

RECUPERATING PASSIVE AND ACTIVE SUSPENSION

FIELD

The present disclosure is directed to passive, semi-active and active suspension systems. More particularly, the present disclosure is directed to passive, semi-active and active suspension systems that recuperate the energy generated during the damping of the suspension system.

BACKGROUND

This section provides background information related to the present disclosure which is not necessarily prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to one of the unsprung portion or suspension and the sprung portion or body of the vehicle through a piston rod. The pressure tube is connected to the other of the unsprung portion and sprung portion of the vehicle. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube.

The movement produced in the hydraulic actuators in both the passive, semi-active and active suspension systems generates energy and this energy is dissipated into heat of the hydraulic actuator's fluid and the components of the actuator.

SUMMARY

This section provides a general summary of the disclosure, and is not a comprehensive disclosure of its full scope or all of its features.

The present disclosure provides the art with a system which captures the energy generated in a passive, semi-active or active suspension system in a way that the energy can be reused later. The captured energy is stored in one or more accumulators in the form of pressurized fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
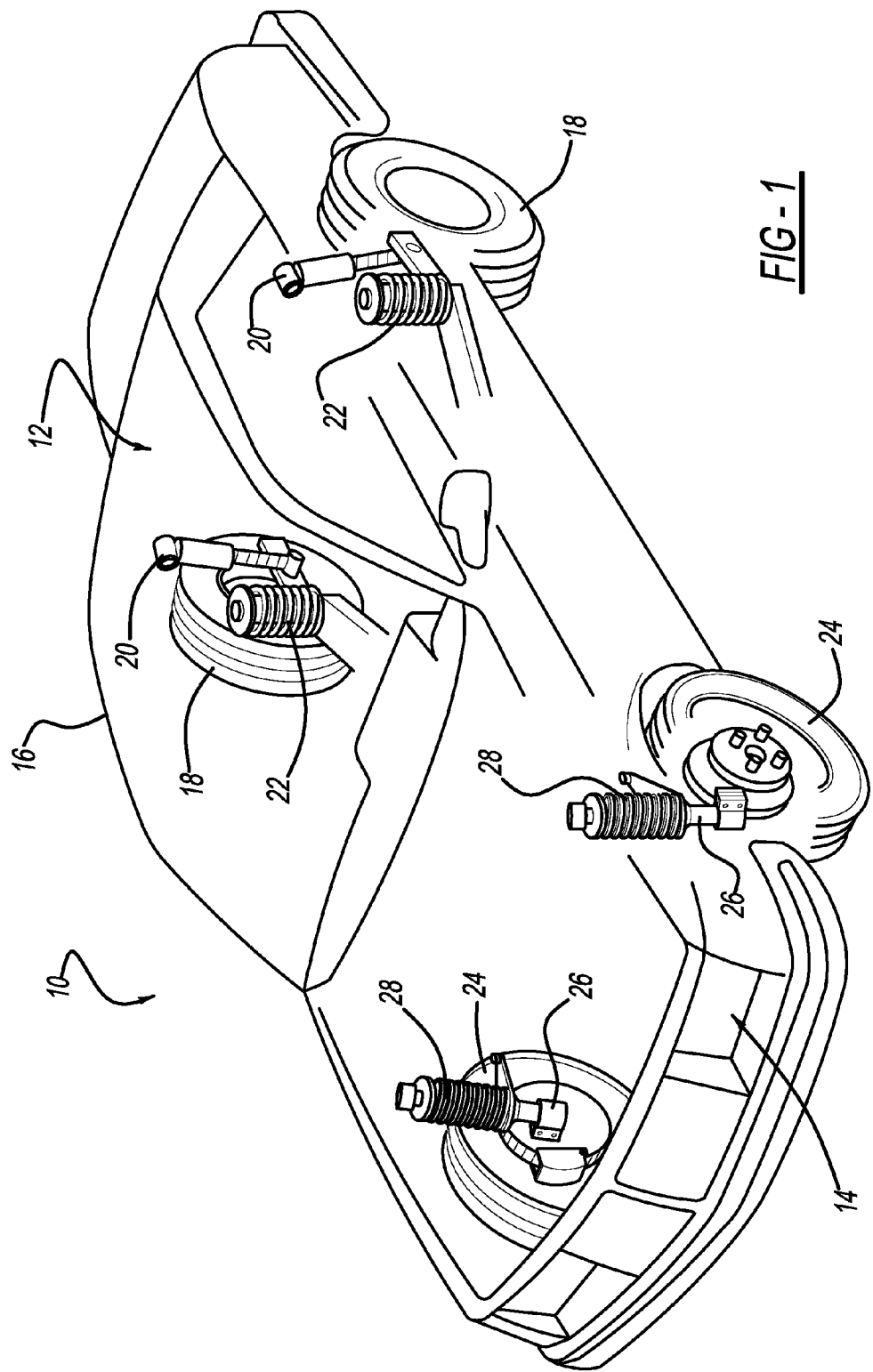
FIG. 1 is a diagrammatic illustration of a vehicle incorporating the energy harvesting suspension system in accordance with the present disclosure.

The following description is merely exemplary in nature and is not intended to limit the present disclosure, application, or uses. There is shown in FIG. 1, a vehicle incorporating a suspension system in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of hydraulic actuators 20 and by a pair of springs 22. Similarly, front suspension 14 includes a transversely extending front axle assembly (not shown) to operatively support a pair of front wheels 24. The front axle assembly is attached to body 16 by means of a pair of hydraulic actuators 26 and by a pair of springs 28. Hydraulic actuators 20 and 26 serve to dampen the relative motion of the unsprung portion (i.e., front and rear suspensions 12, 14) with respect to the sprung portion (i.e., body 16) of vehicle 10. Sensors (not shown), at each wheel 18 and each wheel 24, sense the position and/or the velocity and/or the acceleration of body 16 in relation to rear suspension 12 and front suspension 14. While vehicle 10 has been depicted as a passenger car having front and rear axle assemblies, hydraulic actuators 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "hydraulic damper" as used herein is meant to refer to shock absorbers and hydraulic dampers in general and thus will include McPherson struts and other hydraulic damper designs known in the art.

Figure 2:
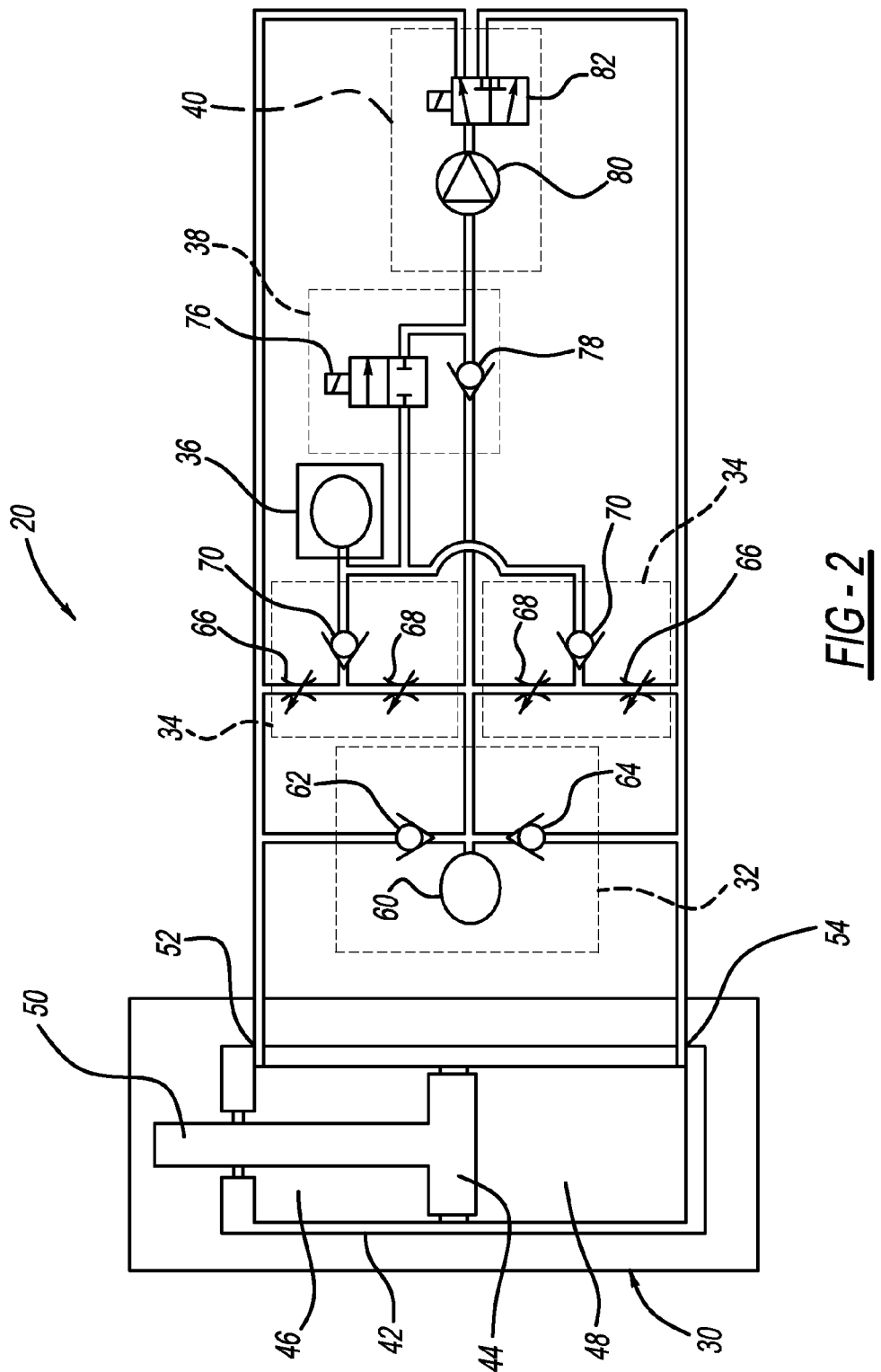
FIG. 2 is a schematic view of the hydraulic actuator illustrated in FIG. 1 illustrating the components of the hydraulic actuator.

Referring to FIG. 2, one of hydraulic actuators 20 is illustrated schematically. While FIG. 2 only illustrates hydraulic actuator 20, hydraulic actuators 26 include the same components discussed below for hydraulic actuator 20. The only difference between hydraulic actuators 20 and 26 may be the way in which the hydraulic actuator is attached to the sprung and/or unsprung portion of the vehicle.

Referring to FIG. 2, hydraulic actuator 20 comprises an actuator 30, a low pressure accumulator subsystem 32, one or more pressure divider subsystems 34, a high pressure accumulator 36, a flow control subsystem 38 and a flow divider subsystem 40.

Actuator 30 comprises a pressure tube 42, a piston 44 dividing pressure tube 42 into an upper working or rebound chamber 46 and a lower working or compression chamber 48 and a piston rod 50 extending through one end of pressure tube 42. As illustrated in FIG. 2, piston 44 is a closed piston without valving to control fluid flow through piston 44 but piston 44 can include valving to control fluid flow between upper working chamber 46 and lower working chamber 48. A first fluid port 52 provides access to upper working chamber 46 and a second fluid port 54 provides access to lower working chamber 48.

Low pressure accumulator subsystem 32 comprises a low pressure accumulator 60, a first check valve 62 and a second check valve 64. First check valve 62 allows fluid flow from low pressure accumulator 60 to upper working chamber 46 but prohibits fluid flow from upper working chamber 46 to low pressure accumulator 60. Second check valve 64 allows fluid flow from low pressure accumulator 60 to lower working chamber 48 but prohibits fluid flow from lower working chamber 48 to low pressure accumulator 60. Low pressure accumulator 60 is connected to both first and second check valves 62 and 64, to flow control subsystem 38 and both pressure divider subsystems 34.

The two pressure divider subsystems 34 illustrated in FIG. 2 include a rebound pressure divider subsystem 34 (the upper pressure divider subsystem) and a compression pressure divider subsystem 34 (the lower pressure divider subsystem). Each pressure divider subsystem 34 comprises a first controlled restriction 66, a second controlled restriction 68 and a check valve 70. In rebound pressure divider subsystem 34, first controlled restriction 66 is located between upper working chamber 46 and check valve 70 and second controlled restriction 68 is located between low pressure accumulator 60 and check valve 70. In the compression pressure divider subsystem 34, first controlled restriction 66 is located between lower working chamber 48 and check valve 70 and second controlled restriction 68 is located between low pressure accumulator 60 and check valve 70. Each check valve 70 allows fluid flow from pressure divider subsystem 34 to high pressure accumulator 36 but prohibits fluid flow from high pressure accumulator 36 to pressure divider subsystem 34.

Pressure divider subsystem 34 performs two functions. First, pressure divider subsystem 34 creates a requested pressure in upper working chamber 46 and/or lower working chamber 48. Second, pressure divider subsystem 34 taps into part of the available hydraulic power and recuperates the available hydraulic power. The general principal is to use first and second controlled restrictions 66 and 68 to create an intermediate pressure level between them where hydraulic energy can be recuperated. This allows maintaining the ability to generate a requested chamber pressure by using first controlled restriction 66. First and second controlled restrictions 66 and 68 can be of restrictive nature or they can be pressure or otherwise controlled restrictions. While first and second controlled restrictions 66 and 68 are illustrated by a symbol of a controlled restrictive restriction, this is not meant to limit the disclosure.

As illustrated in FIG. 2, first and second controlled restrictions 66 and 68 are placed in series. First controlled restriction 66 connects upper working chamber 46 or lower working chamber 48 to the intermediate pressure level. From this intermediate pressure level, depending on the pressure at the intermediate pressure level relative to the pressure in high pressure accumulator 36, energy can be recuperated and stored in high pressure accumulator 36 instead of being dissipated over second controlled restriction 68 which connects the intermediate pressure level to low pressure accumulator 60. Check valve 70 prohibits fluid from flowing back out of high pressure accumulator 36 to the intermediate pressure level when the pressure of the intermediate pressure level is lower than the pressure in the high pressure accumulator 36.

Figure 3:
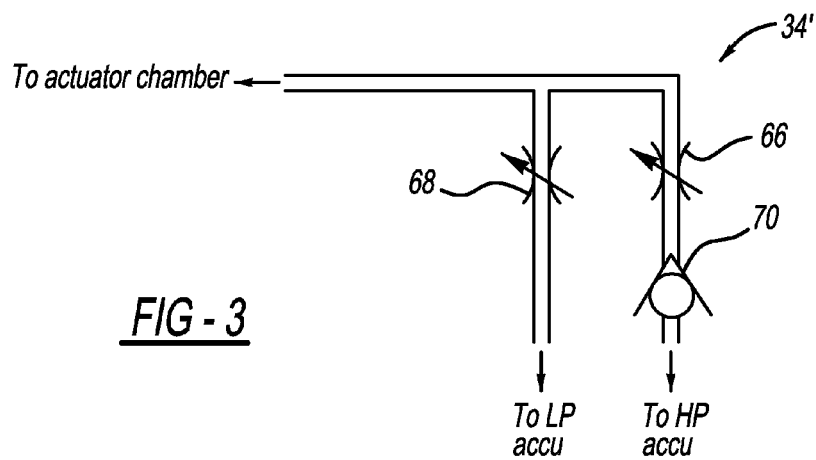
FIG. 3 is a schematic view of a pressure divider subsystem where the controlled restrictions are in parallel in accordance with another embodiment of the disclosure.

FIG. 3 illustrates a pressure divider subsystem 34' which can be used in place of one or both of pressure divider subsystems 34. As illustrated in FIG. 3, pressure divider subsystem 34' comprises first controlled restriction 66, second controlled restriction 68 and check valve 70 where first and second controlled restrictions are positioned in parallel. When first and second controlled restrictions are placed in parallel, both first and second controlled restrictions 66 and 68 are directly connected to upper working chamber 46 or lower working chamber 48. When the pressure in upper working chamber 46 or lower working chamber 48 is above the pressure in high pressure accumulator 36, energy can be recuperated by guiding the fluid flow through first controlled restriction 66 to high pressure accumulator 36. Second controlled restriction 68 guides fluid flow to low pressure accumulator 60 when the pressure in upper working chamber 46 or lower working chamber 48 is too low to recuperate energy. Check valve 70 prevents recuperated high pressure fluid from high pressure accumulator from flowing back to upper working chamber 46 or lower working chamber 48.

Referring back to FIG. 2, high pressure accumulator 36 is utilized to store the recuperated hydraulic energy. High pressure accumulator 36 is connected to actuator 30 and low pressure accumulator subsystem 32 through both pressure divider subsystems 34 and flow divider subsystem 40 through flow control subsystem 38.

Flow control subsystem 38 comprises a hydraulic valve 76 and a check valve 78. Flow control subsystem 38 applies a requested flow rate and has the function of reusing the stored energy in high pressure accumulator 36. Hydraulic valve 76 is connected to high pressure accumulator 36 to access the stored hydraulic energy. Hydraulic valve 76 guides this energy to flow divider subsystem 40. Check valve 78 prevents the fluid flow from hydraulic valve 76 from flowing directly into low pressure accumulator 60.

Flow divider subsystem 40 comprises a pump 80 and a hydraulic switch valve 82. Pump 80 includes a pump and a motor which can also be utilized as a turbine/generator as discussed below. While pump 80 is illustrated as being part of flow divider subsystem 40, pump 80 can be a part of flow control subsystem 38. Flow divider subsystem 40 controls the hydraulic energy from pump 80 and/or high pressure accumulator 36. Pump 80 receives fluid from hydraulic valve 76 of flow control subsystem 38 and/or from low pressure accumulator 60. Fluid from pump 80 is directed to hydraulic switch valve 82. Hydraulic switch valve 82 can guide fluid flow to upper working chamber 46 and/or lower working chamber 48 depending on where it is needed. Hydraulic switch valve 82 can also divide the flow between upper working chamber 46 and lower working chamber 48 in a continuously controlled manner. While hydraulic switch valve 82 is illustrated using a symbol of a switch valve, this is not intended to limit the disclosure.

Figure 4:
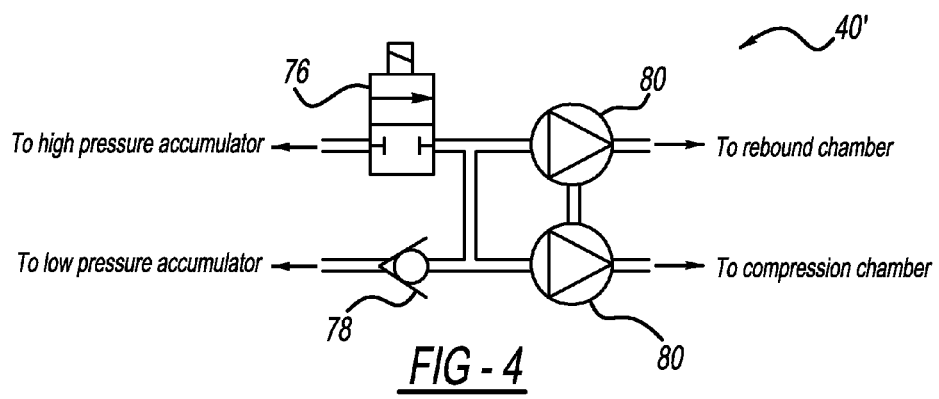
FIG. 4 is a schematic view of a flow divider subsystem in accordance with another embodiment of the disclosure.

FIG. 4 illustrates a flow divider subsystem 40' in accordance with another embodiment of the disclosure which can replace flow control subsystem 38 and flow divider subsystem 40. Flow divider subsystem 40' comprises a first pump 80, a second pump 80, hydraulic valve 76 and check valve 78. Hydraulic valve 76 is connected between high pressure accumulator 36 and first and second pumps 80. Check valve 78 prohibits fluid flow from high pressure accumulator 36 to low pressure accumulator 60. First and second pumps 80 receive fluid from high pressure accumulator 36 through hydraulic valve 76 and from low pressure accumulator 60 through check valve 78. First pump 80 provides fluid flow to upper working chamber 46 and second pump 80 provides fluid flow to lower working chamber 48. While FIG. 4 illustrates a first and a second pump 80, first and second pumps 80 can be replaced with two pump heads. Using two pump heads on one pump however cannot change the ratio of flow going to upper working chamber 46 and lower working chamber 48.

Figure 5:
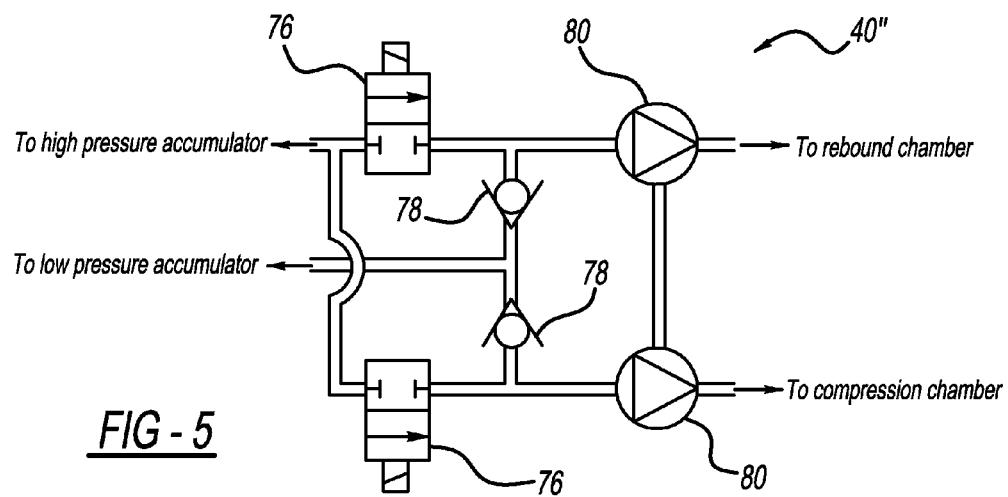
FIG. 5 is a schematic view of a flow divider subsystem in accordance with another embodiment of the disclosure.

FIG. 5 illustrates a flow divider subsystem 40" in accordance with another embodiment of the disclosure which can replace flow control subsystem 38 and flow divider subsystem 40. Flow divider subsystem 40" comprises a first hydraulic valve 76, a second hydraulic valve 76, a first check valve 78, a second check valve 78, a first pump 80 and a second pump 80. First hydraulic valve 76 is disposed between high pressure accumulator 36 and first pump 80. First check valve 78 prohibits fluid flow from high pressure accumulator 36 through first hydraulic valve 76 to low pressure accumulator 60. Second hydraulic valve 76 is disposed between high pressure accumulator 36 and second pump 80. Second check valve 78 prohibits fluid flow from high pressure accumulator 36 through second hydraulic valve 76 to low pressure accumulator 60. First and second pumps 80 receive fluid from high pressure accumulator 36 through first and second hydraulic valve 76 and from low pressure accumulator 60 through first and second check valves 78. While flow divider subsystem 40' illustrated in FIG. 4 may be favorable for cost and packaging, flow divider subsystem 40" illustrated in FIG. 5 may be favorable for performance. Flow divider subsystem 40" illustrated in FIG. 5 can generate a second boost level on top of the general boost level by enabling first and second hydraulic valves 76 simultaneously. In this configuration, one pump 80 can work as a turbine and can add torque to the other pump.

Figure 6:
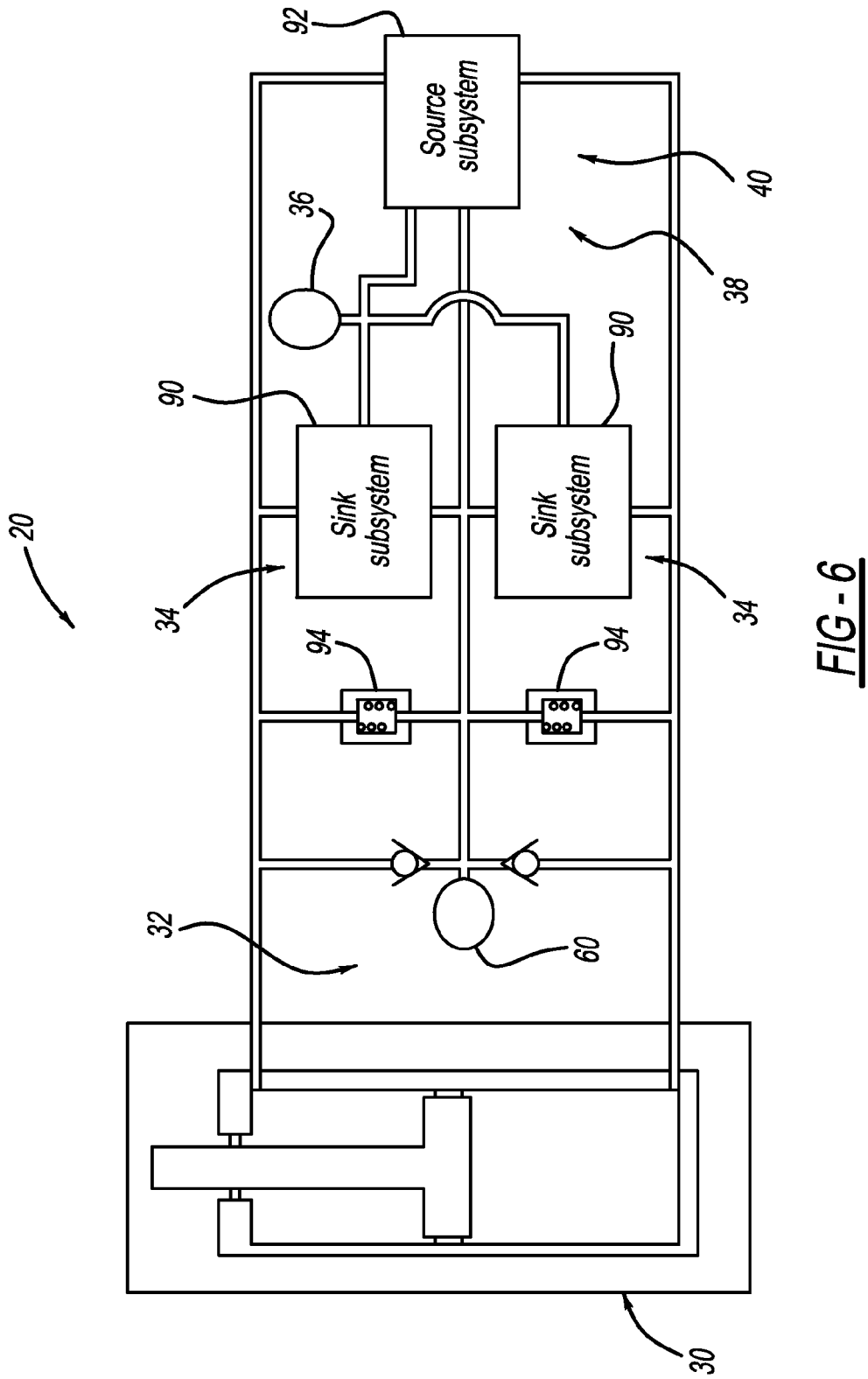
FIG. 6 is a schematic view of a hydraulic actuator in accordance with another embodiment of the present disclosure.

Referring now to FIG. 6, the various subsystems 32, 34, 36, 38 and 40 described above can be combined into many main systems. As illustrated in FIG. 6, the general overlaying main system for hydraulic actuator 20 comprises actuator 30, low pressure accumulator subsystem 32, one or more sink subsystems 90 (illustrated as pressure divider subsystem 34), high pressure accumulator 36 and a source subsystem 92 (which includes flow control subsystem 38 and flow divider subsystem 40 as illustrated). FIG. 6 also illustrates a pair of safety blow off valves 94 which limit the maximum pressure in the system.

Sink subsystem 90 performs the function of building up a pressure drop in upper working chamber 46 and/or lower working chamber 48 and to allow fluid to flow out of upper working chamber 46 and/or lower working chamber 48 and guide the fluid into either high pressure accumulator 36 or low pressure accumulator 60. Thus, sink subsystem 90 holds the recuperation function to store fluid in high pressure accumulator 36. The subsystems series and parallel pressure divider discussed above are possible interpretations for this general block.

Source subsystem 92 performs the flow divider function. Source subsystem 92 can provide fluid flow to upper working chamber 46 and/or lower working chamber 48. The switch valve and dual pump head variations discussed above are possible interpretations for this block. Source subsystem 92 can also use the stored energy in high pressure accumulator 36 by use of the flow control system described above. FIGS. 7-12 illustrate various schematics of the combinations that are possible.

Figure 7:
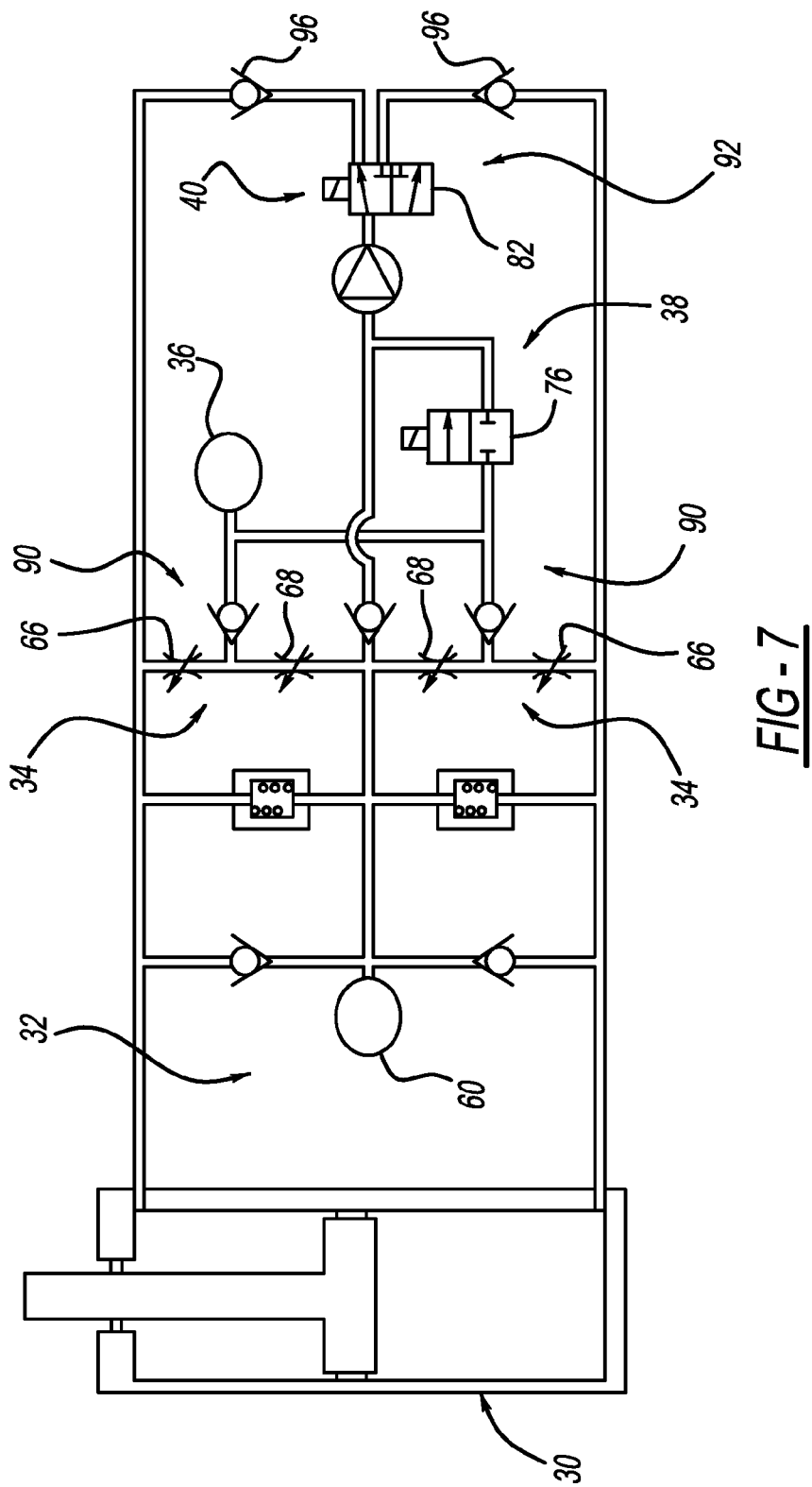
FIG. 7 is a schematic view of a hydraulic actuator in accordance with another embodiment of the present disclosure.
Figure 8:
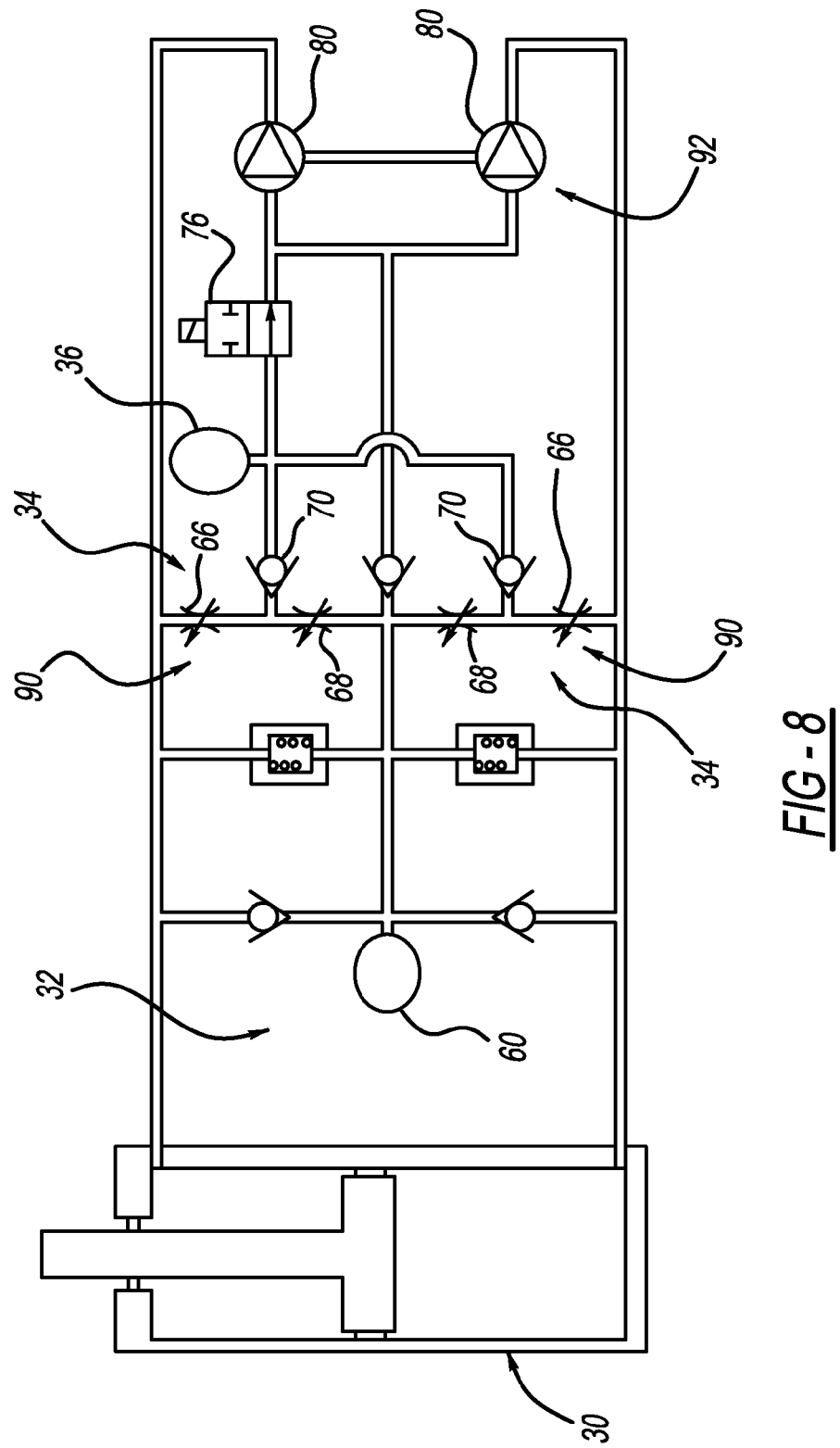
FIG. 8 is a schematic view of a hydraulic actuator in accordance with another embodiment of the present disclosure.
Figure 9:
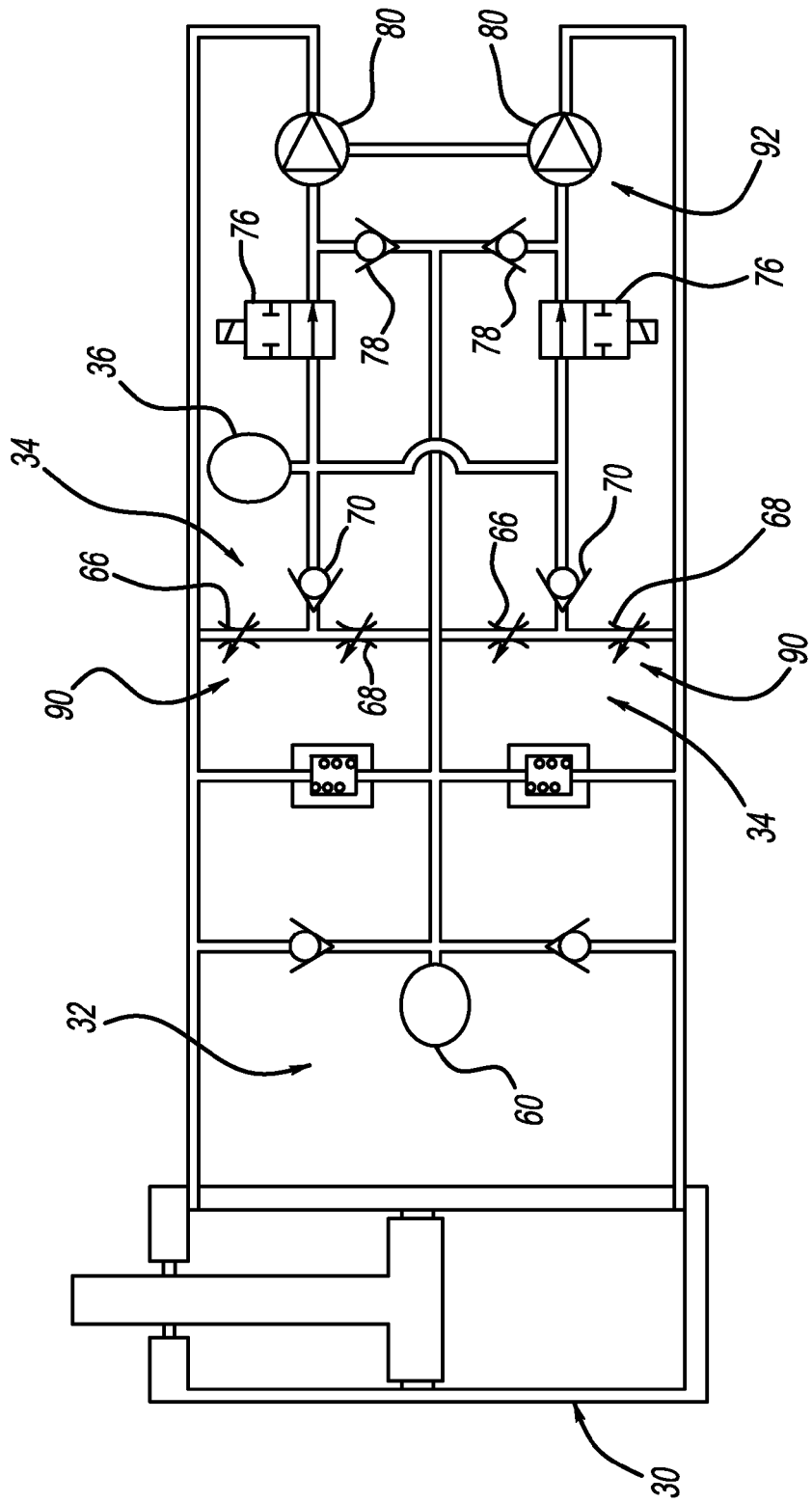
FIG. 9 is a schematic view of a hydraulic actuator in accordance with another embodiment of the present disclosure.

Referring to FIG. 7, sink subsystems 90 are illustrated as a series pressure divider (pressure divider subsystem 34 as illustrated) and source subsystem 92 is illustrated as including a switch valve. Referring to FIG. 8, sink subsystems 90 are illustrated as a series pressure divider (pressure divider subsystem 34 as illustrated) and source subsystem 92 is illustrated as a dual pump head with a common valve (flow divider subsystem 40' as illustrated). Referring to FIG. 9, sink subsystems 90 are illustrated as a series pressure dividers (pressure divider subsystem 34 as illustrated) and source subsystem 92 is illustrated as a dual pump head with individual valves (flow divider subsystem 40" as illustrated).

Figure 10:
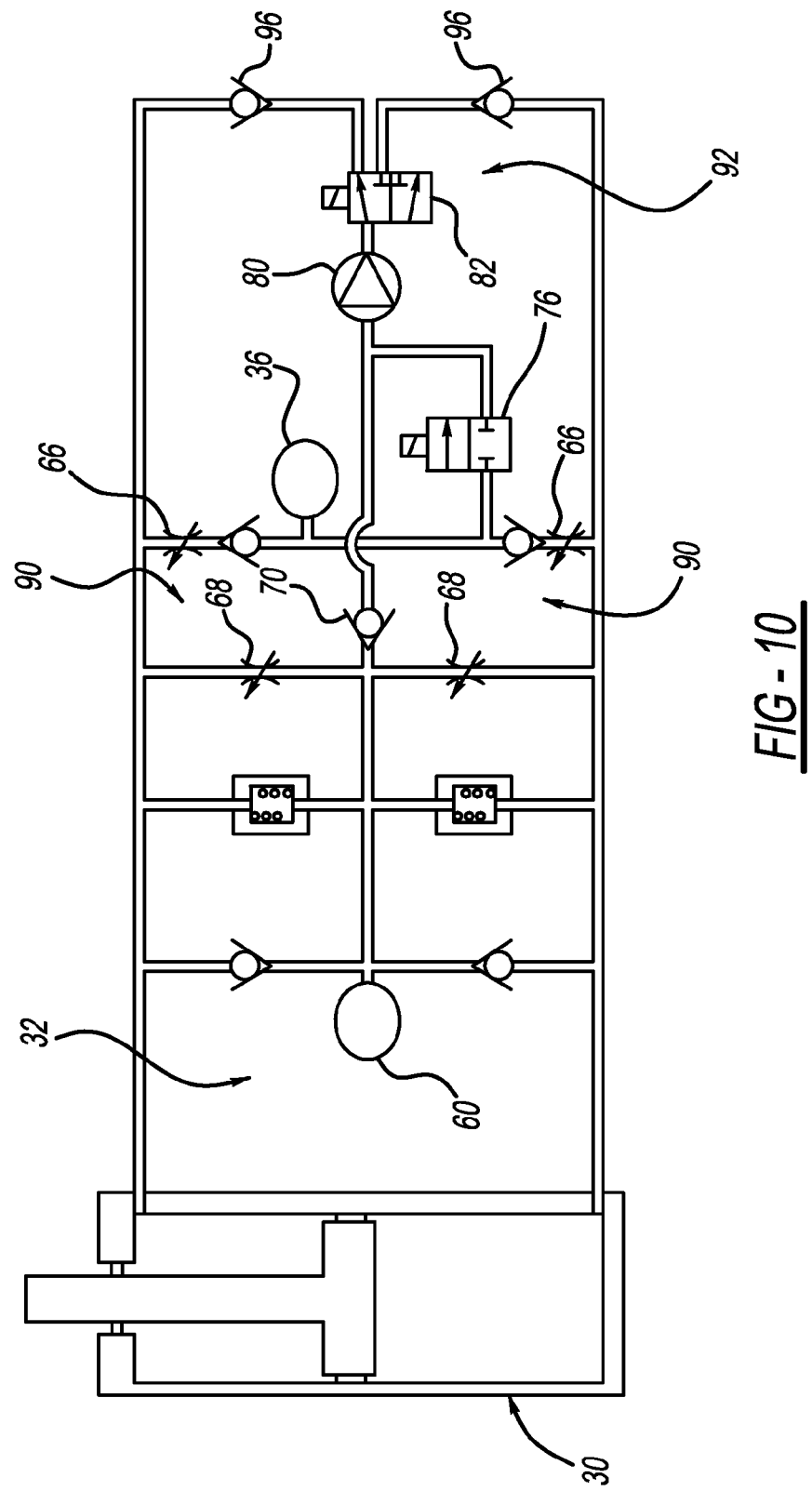
FIG. 10 is a schematic view of a hydraulic actuator in accordance with another embodiment of the present disclosure.
Figure 11:
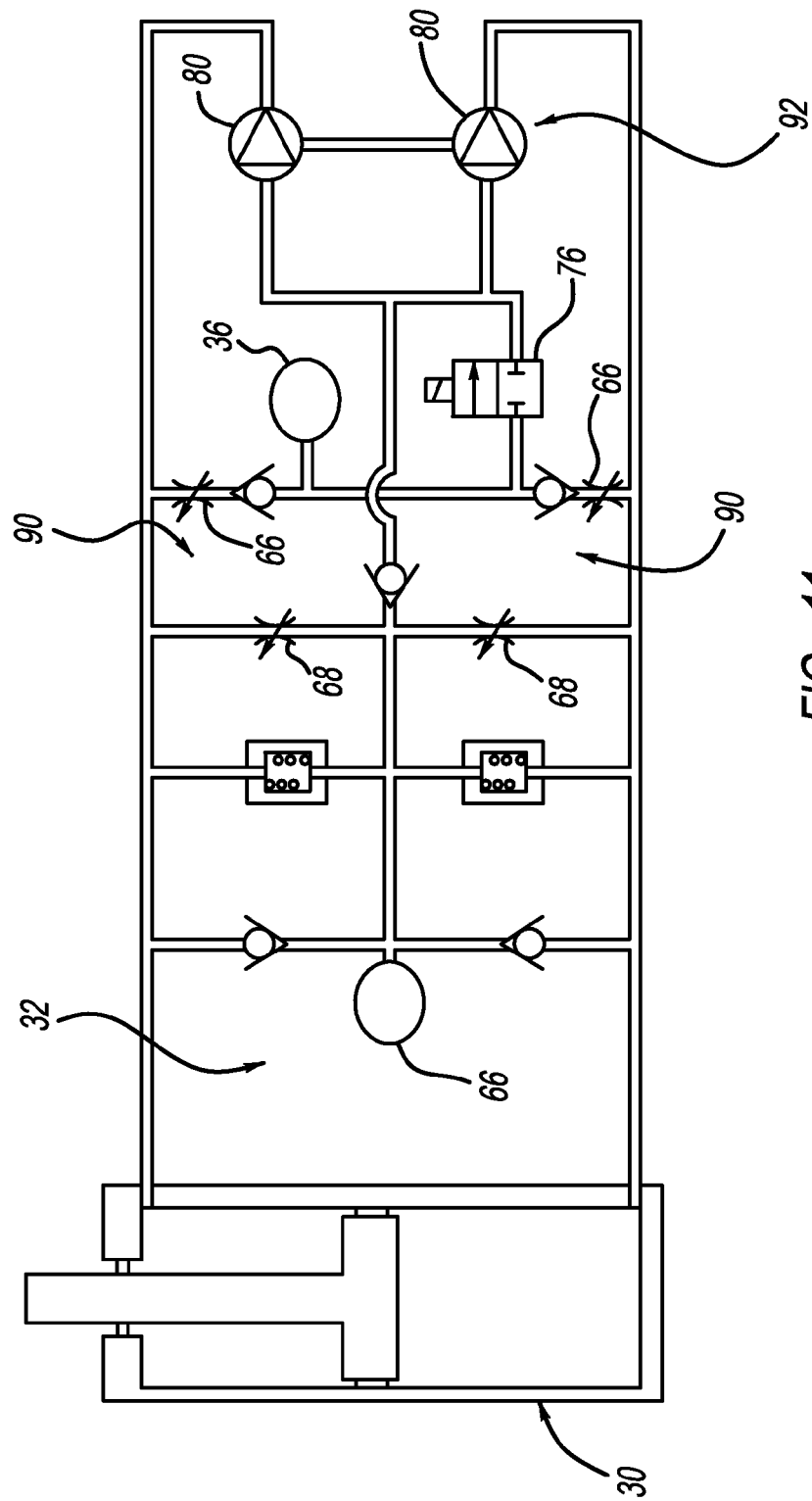
FIG. 11 is a schematic view of a hydraulic actuator in accordance with another embodiment of the present disclosure.
Figure 12:
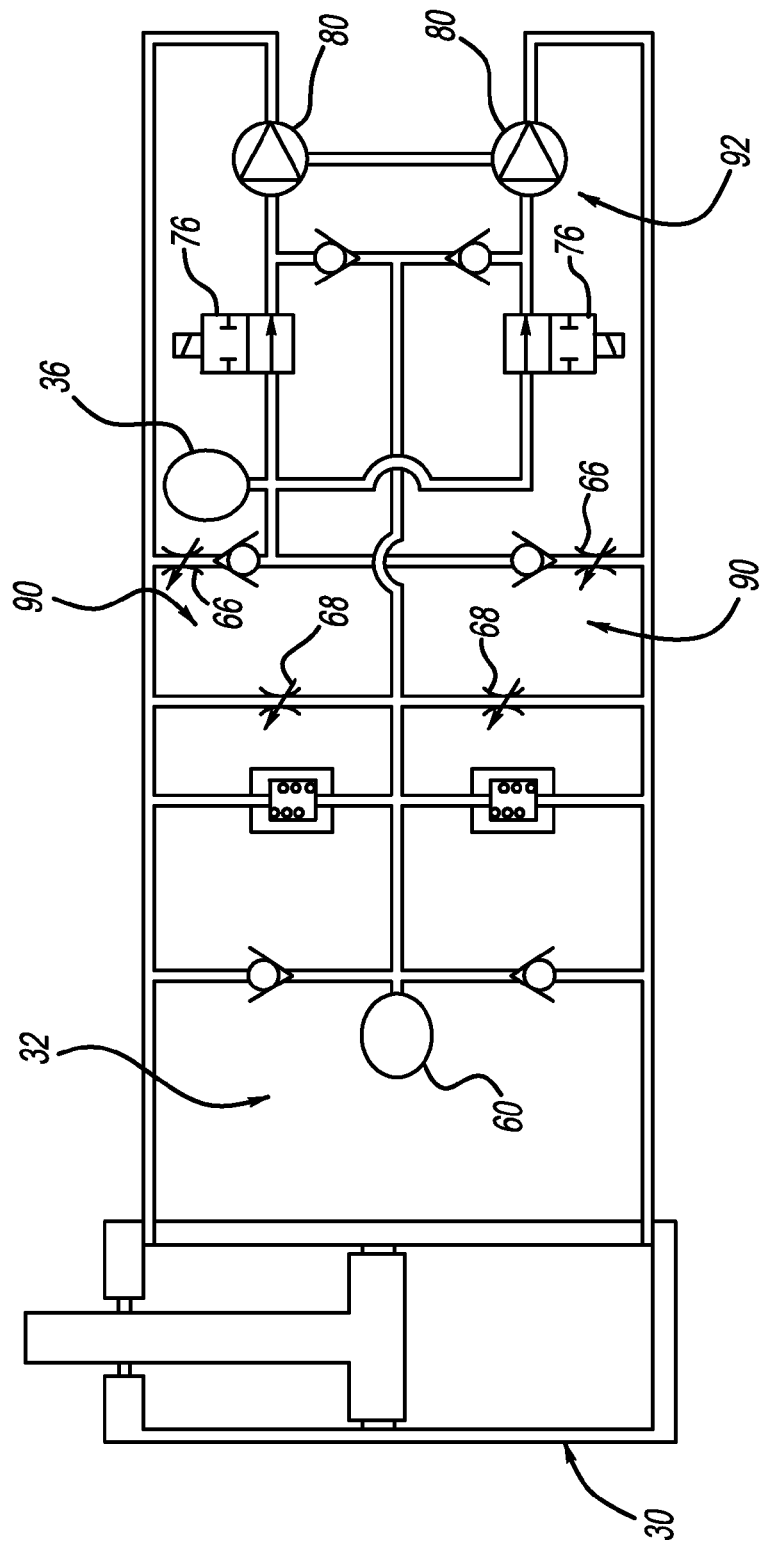
FIG. 12 is a schematic view of a hydraulic actuator in accordance with another embodiment of the present disclosure.

Referring to FIG. 10, sink subsystems 90 are illustrated as a parallel pressure divider (pressure divider subsystem 34' as illustrated) and source subsystem 92 is illustrated as including a switch valve (flow control subsystem 38 and flow divider subsystem 40 as illustrated). Referring to FIG. 11, sink subsystems 90 are illustrated as a parallel pressure divider (pressure divider subsystem 34' as illustrated) and source subsystem 92 is illustrated as a dual pump head with a common valve (flow divider subsystem 40' as illustrated). Referring to FIG. 12, sink subsystems 90 are illustrated as a parallel pressure divider (pressure divider subsystem 34' as illustrated) and source subsystem 92 is illustrated as a dual pump head with individual valves (flow divider subsystem 40" as illustrated).

Also, as illustrated in FIGS. 7 and 10, a pair of check valves 96 have been added to source subsystem 92 to prevent fluid drain between the pressure chambers.

Referring now to FIGS. 13-20, various working modes of hydraulic actuator 20 illustrated in FIG. 7 are illustrated. While FIGS. 13-20 use the embodiment illustrated in FIG. 7, it is to be understood that the other embodiments illustrated in FIGS. 8-12 operate in a similar manner and their flow pattern can be easily derived by one skilled in the art. Also, the fluid flow illustrated in FIGS. 13-20 is illustrated for the generation of inward or rebound forces. It is to be understood that the generation of compression forces is symmetric to the generation of rebound forces.

Figure 13:
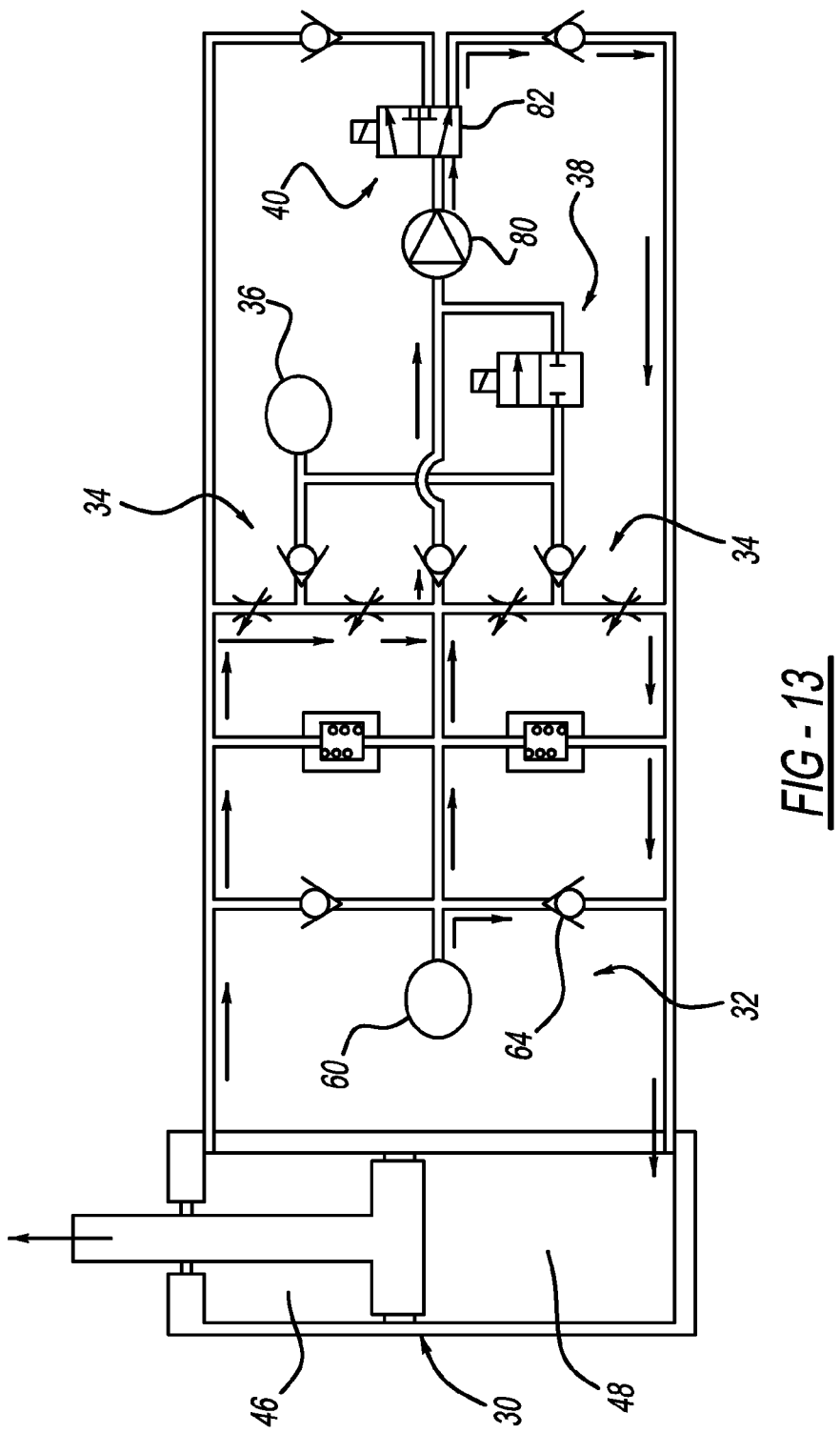
FIG. 13 is a schematic view of the hydraulic actuator in FIG. 7 illustrating passive force generation without recuperation.

FIG. 13 illustrates a mode that generates passive forces without recuperation. When the pressure that is requested in upper working chamber 46 is smaller than the pressure in high pressure accumulator 36, no energy can be recuperated and all the energy is dissipated in rebound or upper pressure divider subsystem 34 illustrated in FIG. 13. The fluid flow provided by pump 80 is routed to the low pressure side to conserve energy but still have a fluid flow available should there be a sudden need for active operation. Depending on the rod velocities relative to the flow of pump 80, fluid will flow through compression or lower pressure divider subsystem 34 or alternately through second check valve 64. As illustrated in FIG. 13, the fluid flow is through second check valve 64.

Figure 14:
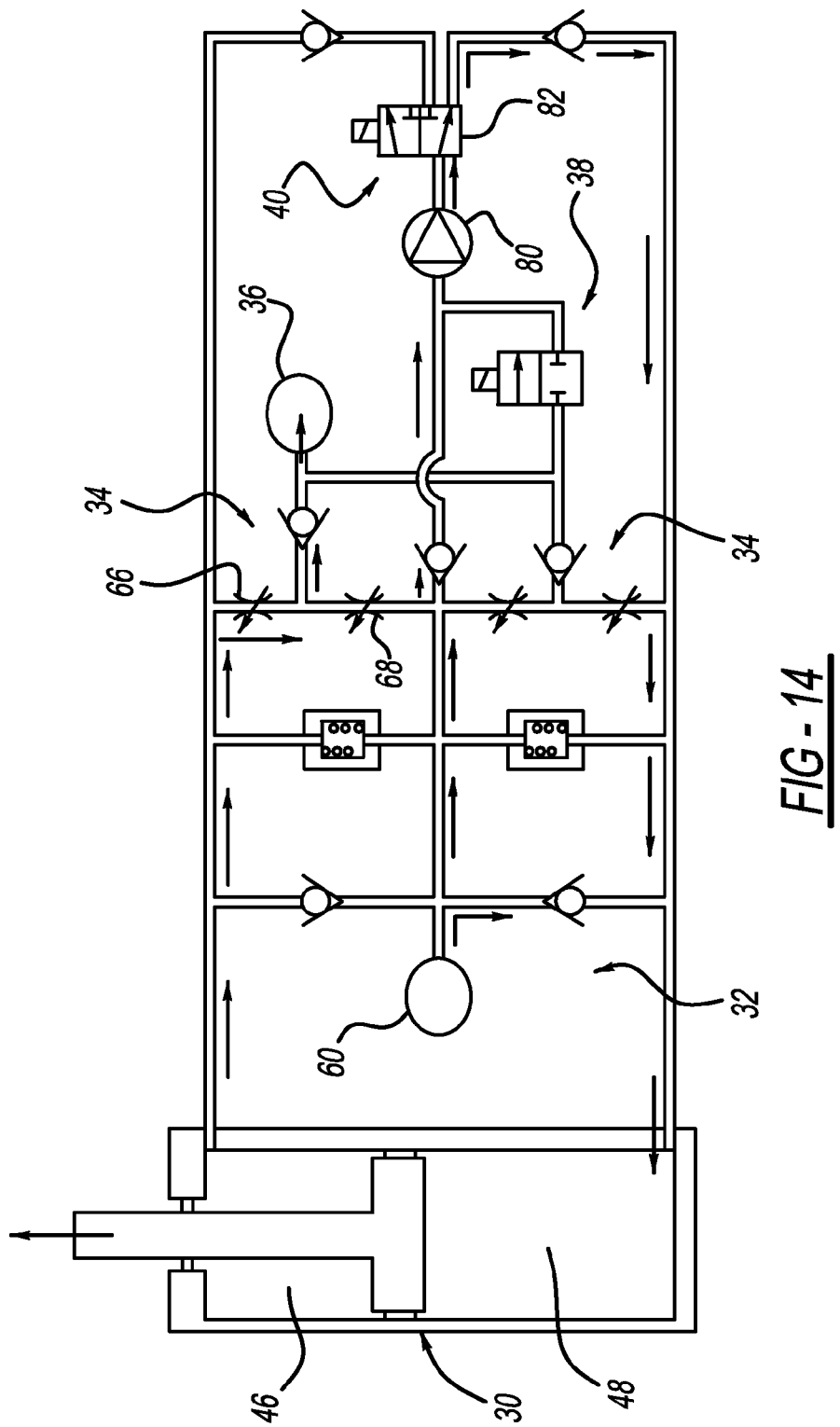
FIG. 14 is a schematic view of the hydraulic actuator in FIG. 7 illustrating passive force generation with recuperation.

FIG. 14 illustrates a mode that generates passive forces with recuperation. When the pressure that is requested in upper working chamber 46 which generate passive forces is higher than the pressure in high pressure accumulator 36, energy recuperation can be accomplished by routing the high pressure fluid into high pressure accumulator 36 by closing second controlled restriction 68 in rebound pressure divider subsystem 34. Depending on the type of restriction for second controlled restriction 68, some fluid may still flow to low pressure accumulator 60. FIG. 14 also illustrates the fluid flow is through second check valve 64.

Figure 15:
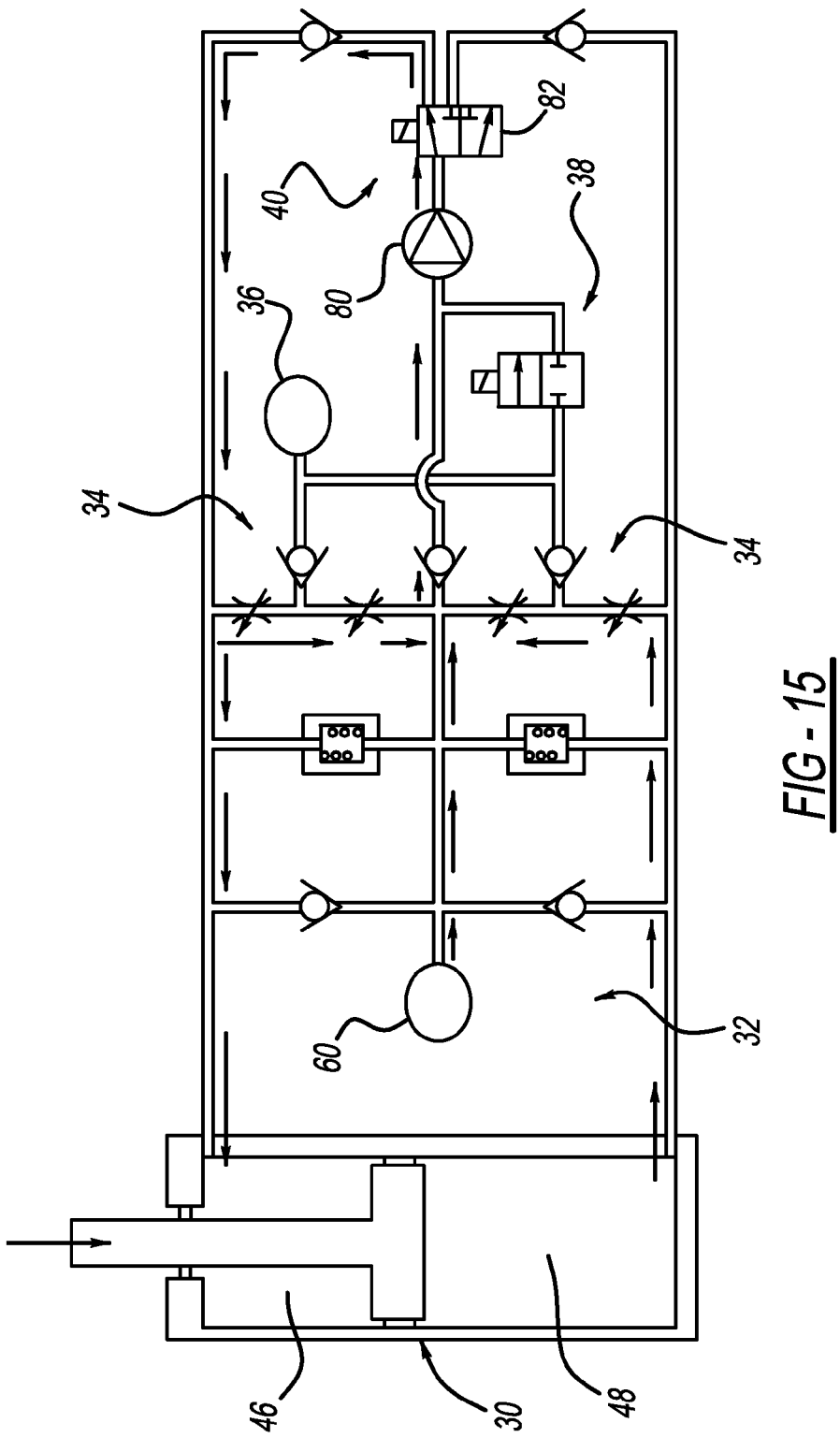
FIG. 15 is a schematic view of the hydraulic actuator in FIG. 7 illustrating active force generation and high passive force generation.

FIG. 15 illustrates a mode with active force and high passive forces. When the pressure requested in upper working chamber 46 is below the fluid pressure in high pressure accumulator 36, and pump 80 has sufficient power to generate the requested fluid flow, the fluid flow illustrated in FIG. 15 occurs. The fluid flow provided by pump 80 is now routed to upper working chamber 46 in order to generate active forces. The fluid that flows out of lower working chamber 48 goes through compression pressure divider subsystem 34. In this mode, the generated pressure drop through compression pressure divider subsystem 34 needs to be a minimum for efficient operation. This mode also allows generating passive forces that are higher than the modes illustrated in FIGS. 13 and 14. The fluid flow provided by pump 80 can be used to generate an additional pressure drop over rebound pressure divider subsystem 34.

Figure 16:
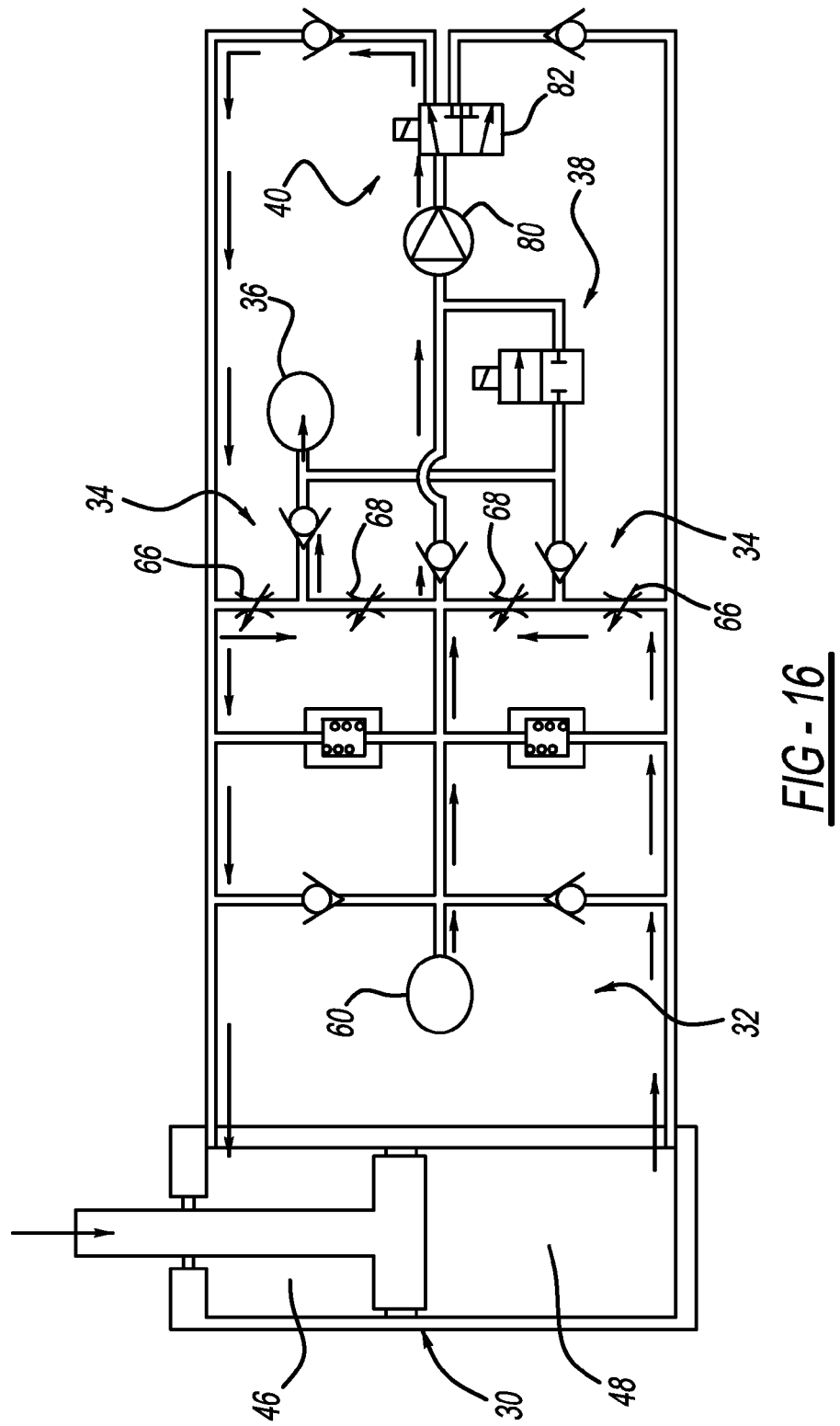
FIG. 16 is a schematic view of the hydraulic actuator in FIG. 7 illustrating active and passive force generation with decoupling.

FIG. 16 illustrates a mode with active and passive forces with decoupling. When the pressure that is requested in upper working chamber 46 is above the fluid pressure within high pressure accumulator 36, the energy dissipation over second controlled restriction 68 of rebound pressure divider subsystem 34 can be avoided. This mode can be used with moderate active and passive force generation when pump 80 has enough power. In addition, high pressure accumulator 36 is filled. Depending on the type of restriction for second controlled restriction 68, some fluid may still flow to low pressure accumulator 60.

Figure 17:
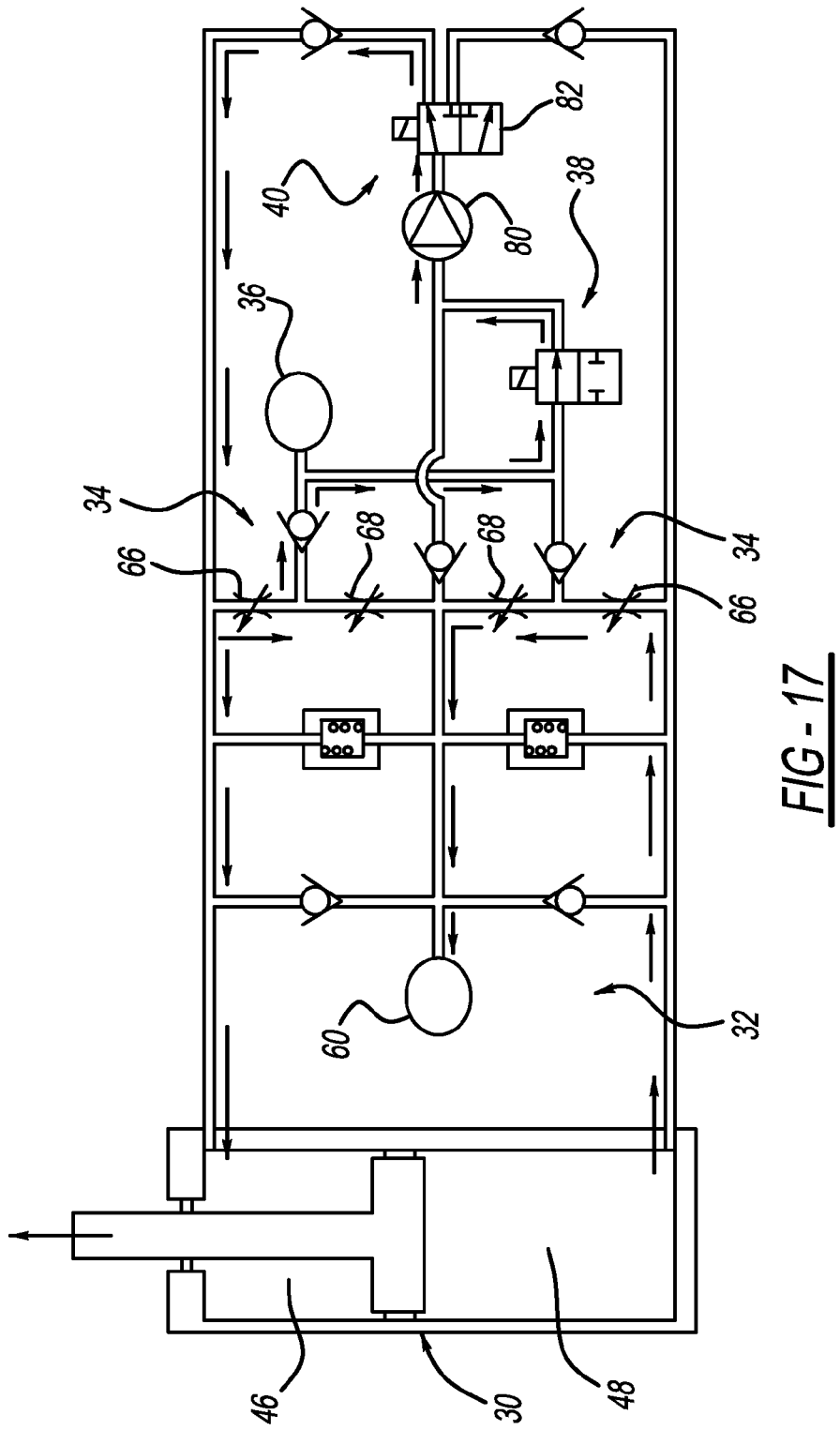
FIG. 17 is a schematic view of the hydraulic actuator in FIG. 7 illustrating active and passive force generation with decoupling and boost.

FIG. 17 illustrates a mode with active and passive forces with decoupling and boost. When high forces are required, the stored energy in high pressure accumulator 36 can be used to assist pump 80 to sustain a certain pump flow. This mode can also be controlled in another manner. A state can be created where upper working chamber 46 and lower working chamber 48 do not share a common fluid flow path. Upper working chamber 46 and its corresponding circuit are on high fluid pressure and lower working chamber 48 and its corresponding circuit are on low fluid pressure. This is defined as decoupling and it generates a starting offset force without energy consumption. With fluid flow from pump 80, first and second controlled restrictions 66 and 68 can increase or decrease the starting offset to meet the actual force required. This decoupled boost mode allows for efficient usage of the provided energy. It is also a sustainable state to generate high forces with low pump power because of decoupling.

Figure 18:
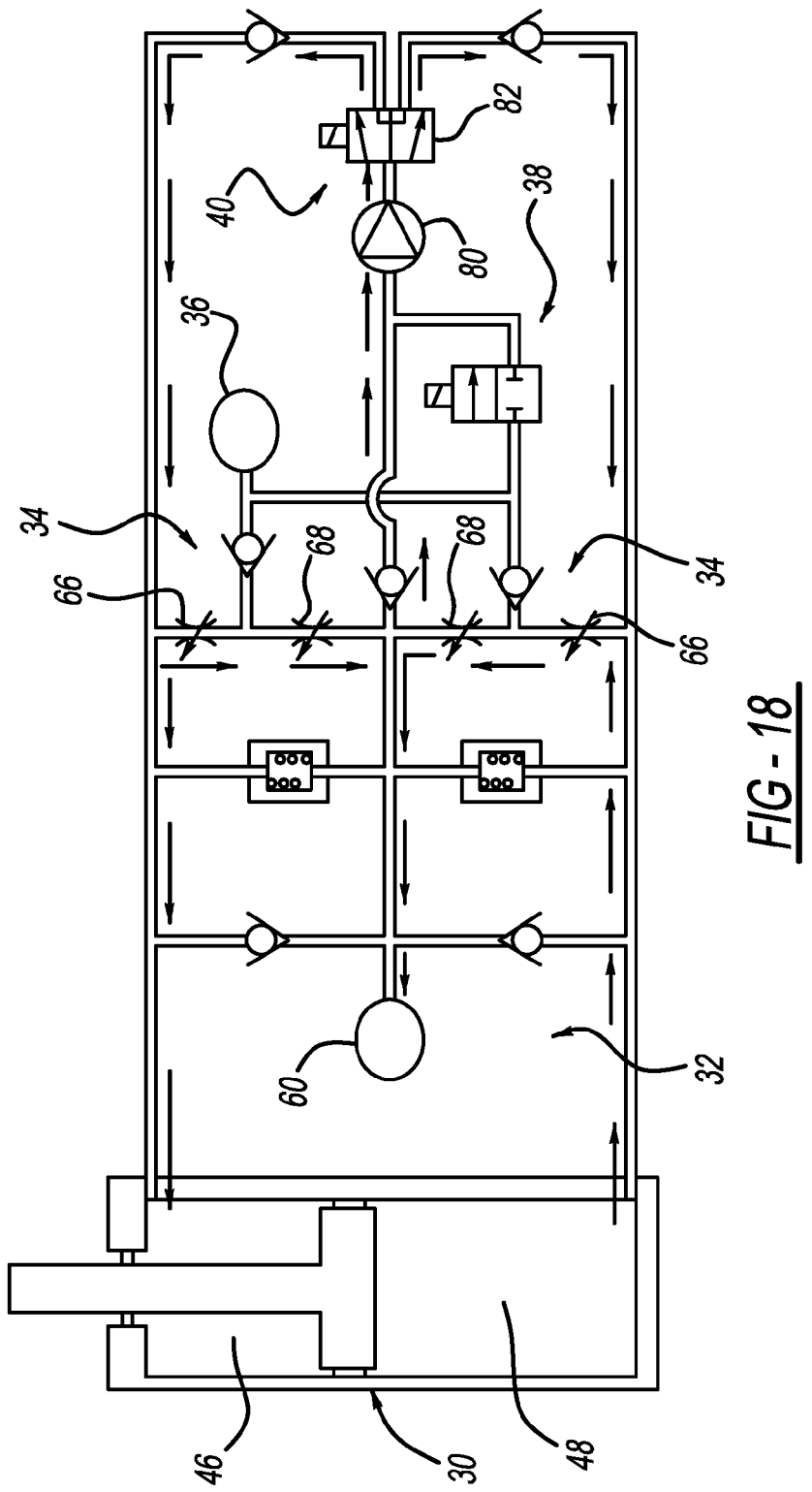
FIG. 18 is a schematic view of the hydraulic actuator in FIG. 7 illustrating a linear control mode.

FIG. 18 illustrates a linear control mode. This mode can be used when low forces are required when moving at low velocities. The benefit of this mode is that no discrete valves have to switch when moving in a small area around zero force and zero velocity. Only the continuous controlled valves, first and second controlled restrictions 66 and 68 for each pressure divider subsystem 34 are operated. Hydraulic switch valve 82 is in its middle position or hydraulic switch valve 82 can change around this position. This mode allows for a very smooth and NVH (noise, vibration and harshness) friendly operation.

Figure 19:
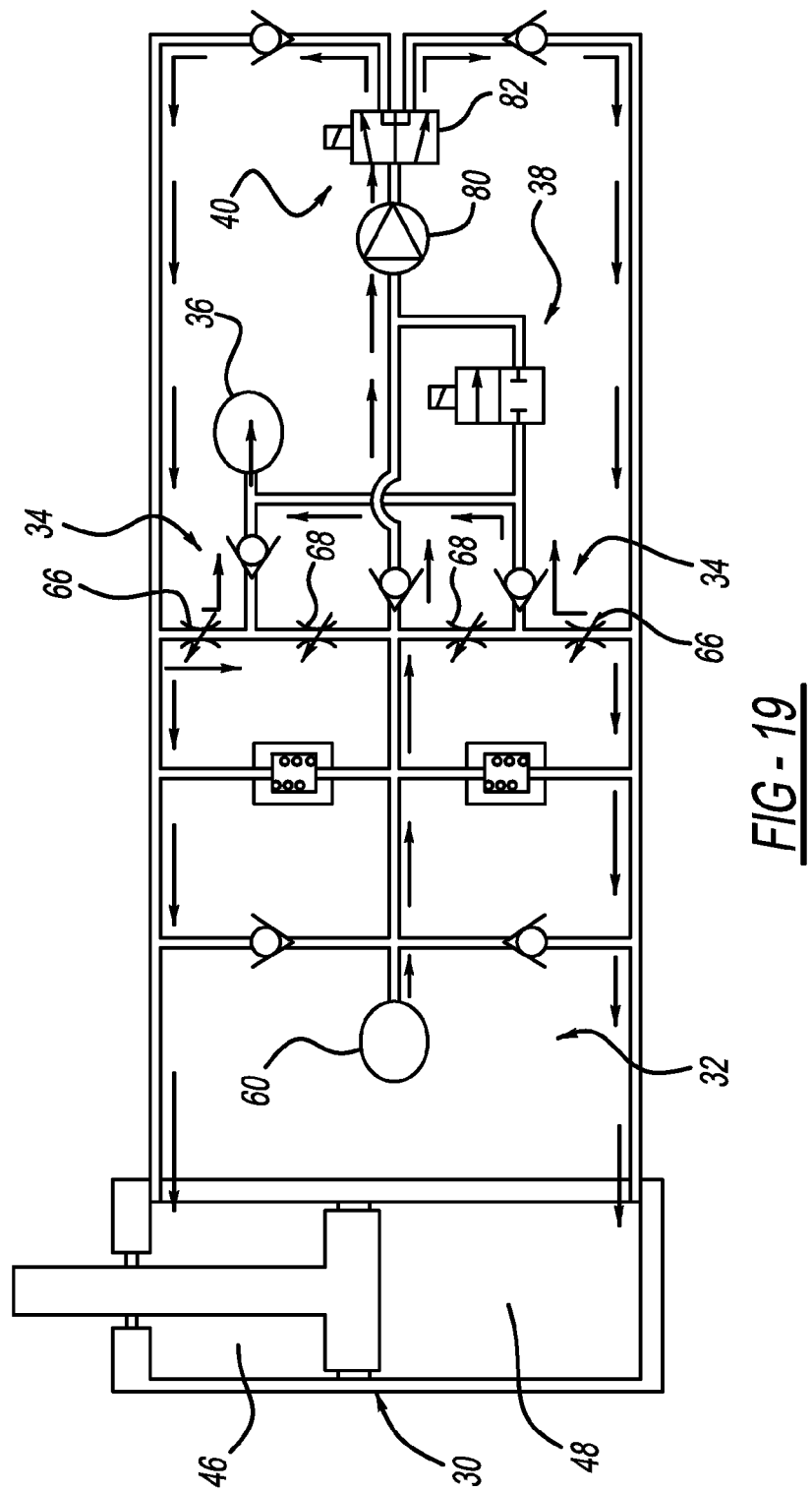
FIG. 19 is a schematic view of the hydraulic actuator in FIG. 7 illustrating a pump up mode for the high pressure accumulator.

FIG. 19 illustrates a mode which pumps up high pressure accumulator 36. In this mode, hydraulic switch valve 82 is in a middle position and both second controlled restrictions 68 are closed. This guides fluid flow into high pressure accumulator 36 and charges it. During this mode, which is similar to the linear control mode illustrated in FIG. 18, small forces can be generated in the four quadrants. This gives the possibility to recharge the system while driving on a smooth road without sacrificing full control. High pressure accumulator 36 can also be pumped up by routing the fluid with hydraulic switch valve 82 being at one side, if the fluid needed to fill high pressure accumulator 36 is smaller than the fluid provided by pump 80. This, however, will generate a resulting force in one direction which is determined by hydraulic switch valve 82.

Figure 20:
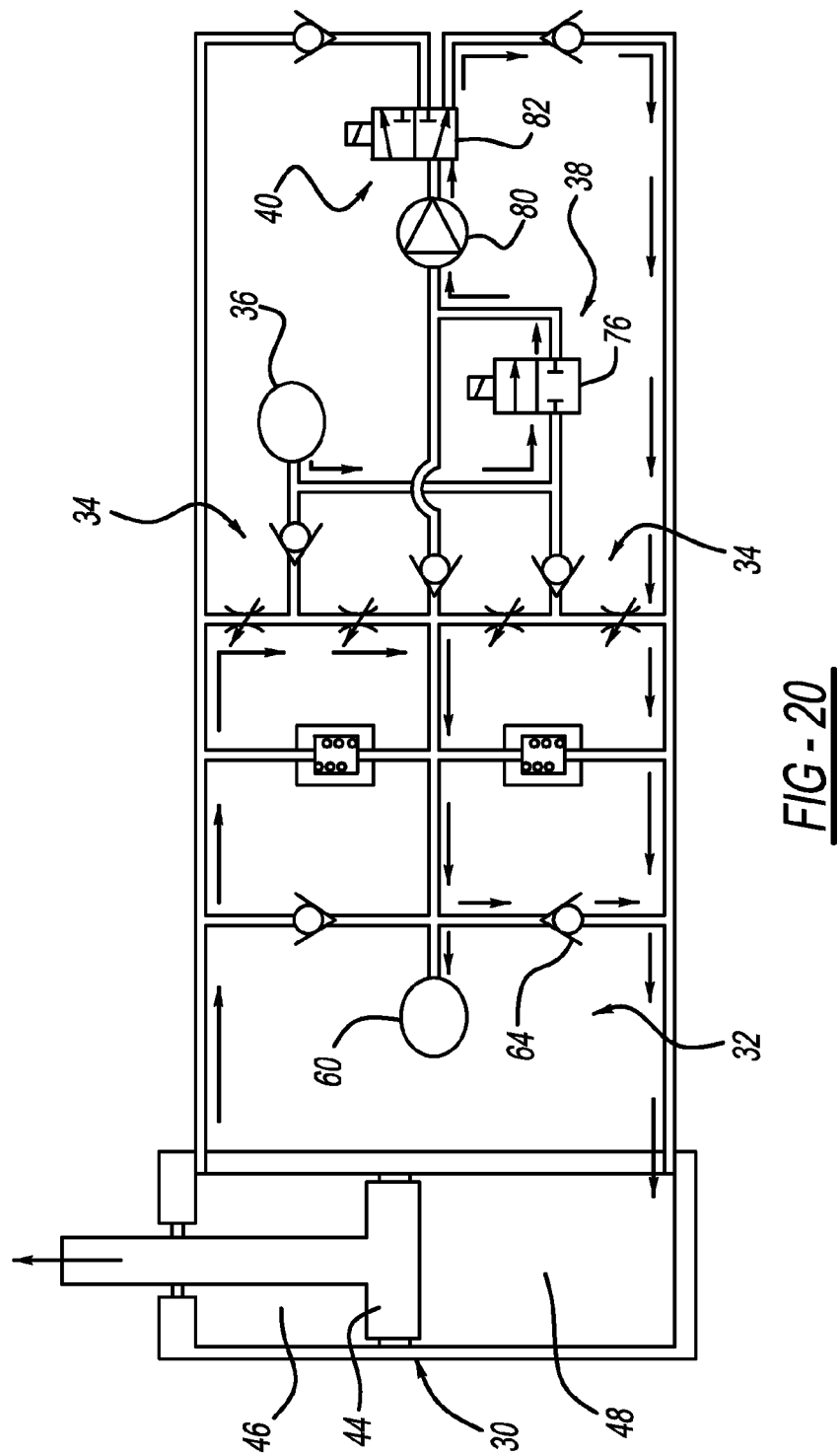
FIG. 20 is a schematic view of the hydraulic actuator in FIG. 7 illustrating a regeneration mode.

FIG. 20 illustrates a regeneration mode. When fluid pressure within high pressure accumulator 36 is too high, this high pressure can always be lowered by enabling hydraulic valve 76 of flow control subsystem 38. Pump 80 will control the fluid flow out of high pressure accumulator 36 and drain it. Depending on the force requirements at the moment, the energy provided by pump 80 and high pressure accumulator 36 can be used to build up active forces (achieved by switching to the high pressure side) or if active forces are not required, this energy can be converted to electrical energy by switching to the low pressure side. The switching to the low pressure side is illustrated in FIG. 20 and this mode utilizes pump 80 with its motor as a turbine/generator to convert the hydraulic energy into electric energy. This is the recuperation mode. FIG. 20 illustrates recuperation while generating a passive rebound mode. Depending on the velocity of piston 44 relative to the fluid flow of pump 80, fluid will flow through compression pressure divider subsystem 34 or, as illustrated in FIG. 20, through second check valve 64 of low pressure accumulator subsystem 32.

Figure 21:
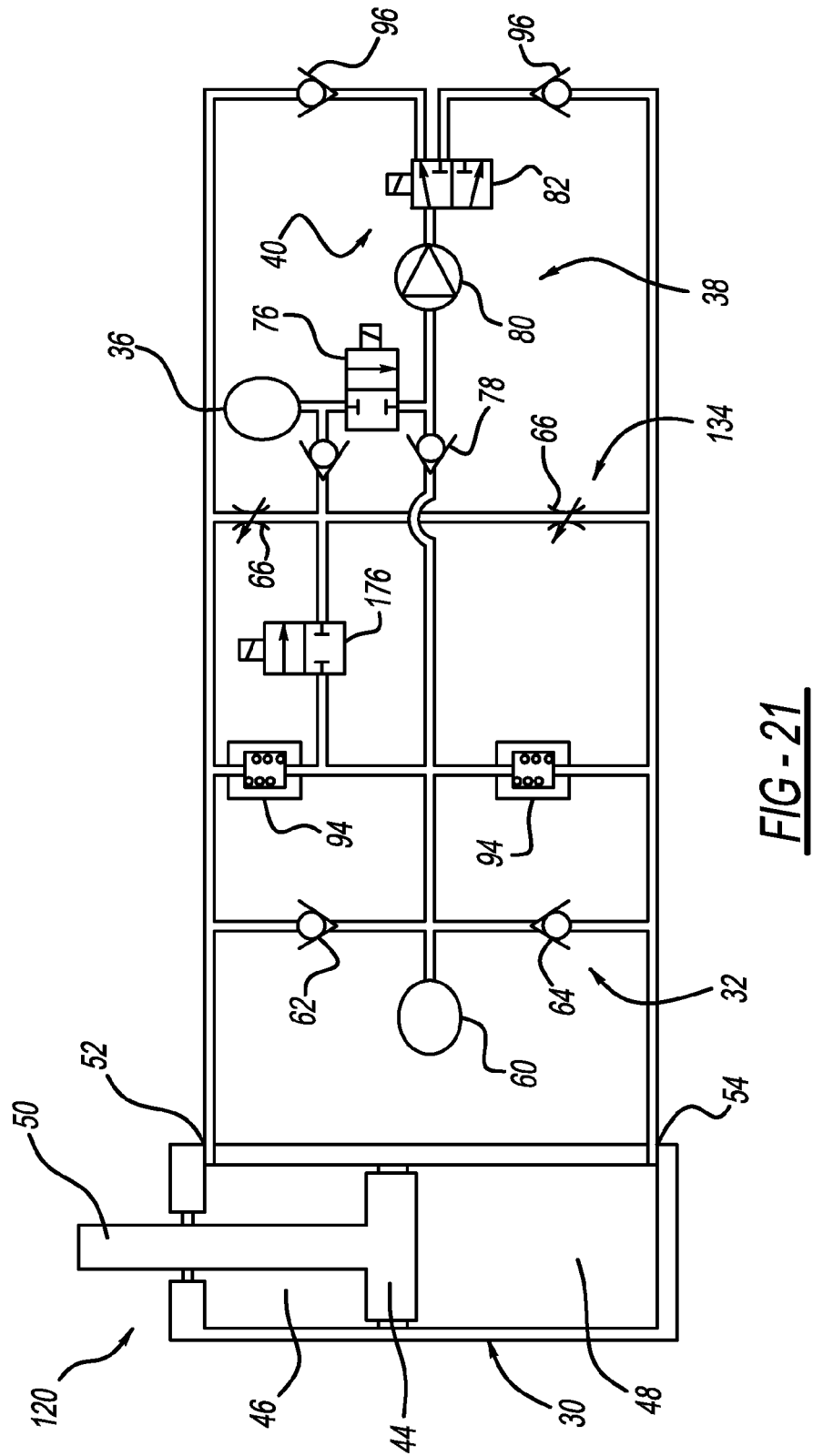
FIG. 21 is a schematic view of a hydraulic actuator illustrating alternative designs.

Referring now to FIG. 21, a hydraulic actuator 120 is illustrated. Hydraulic actuator 120 comprises actuator 30, low pressure accumulator subsystem 32, one or more pressure divider subsystems 134, high pressure accumulator 36, flow control subsystem 38 and flow divider subsystem 40. A hydraulic valve 176 connects blow off valves 94 to high pressure accumulator 36 and also connects first controlled restriction 66 to low pressure accumulator 60.

Each pressure divider subsystem 34 illustrated in FIG. 2 includes first controlled restriction 66 and second controlled restriction 68. Each pressure divider subsystem 134 illustrated in FIG. 21 includes only first controlled restriction 66. Second controlled restriction 68 has been eliminated to reduce the complexity of the system. While this reduces the complexity of the system, it also sacrifices the possibility of decoupling. The operation and function for hydraulic actuator 120 is the same as described above for hydraulic actuator 120 except for the decoupling.

Figure 22:
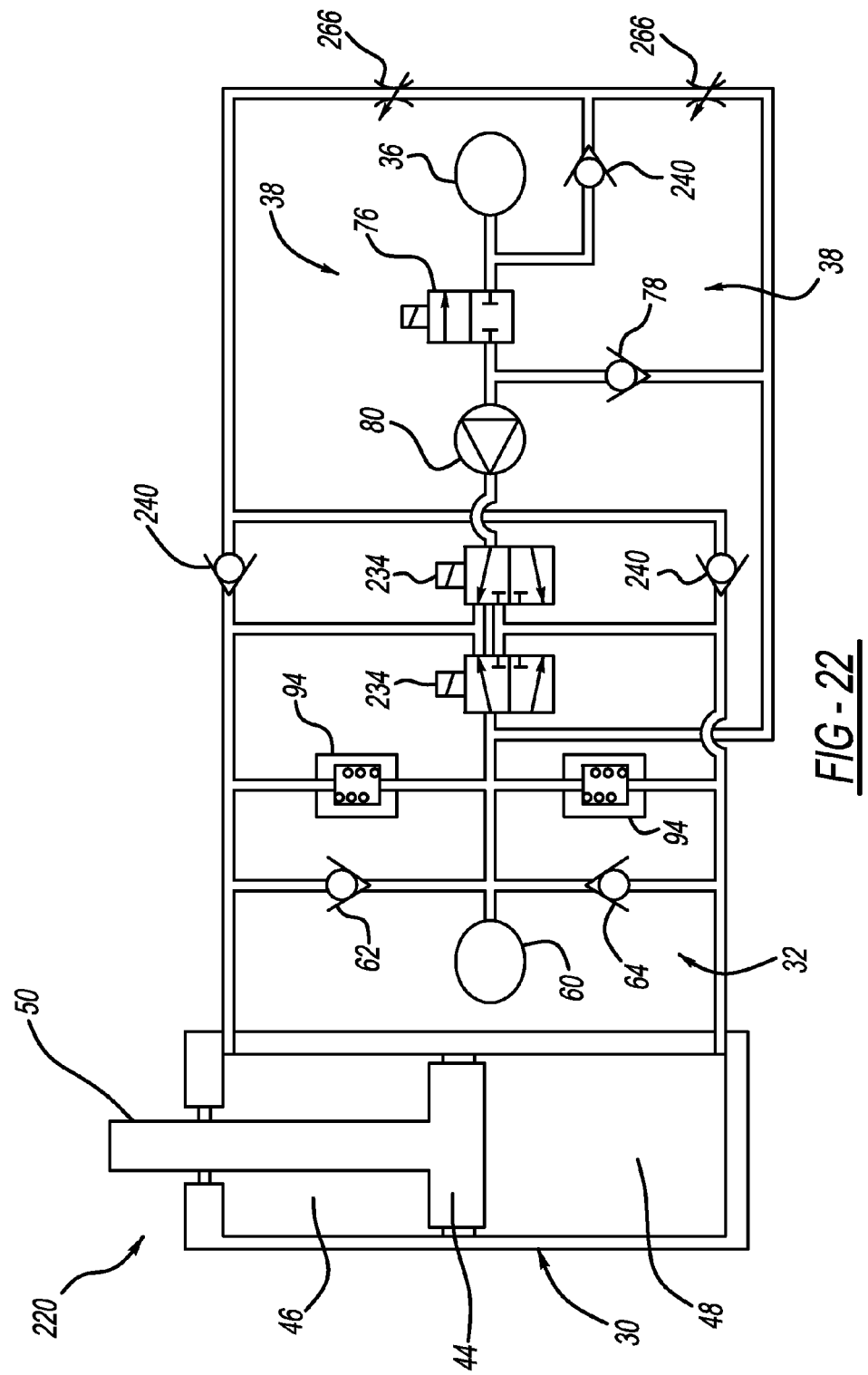
FIG. 22 is a schematic view of a hydraulic actuator illustrating alternative designs.

Referring now to FIG. 22, a hydraulic actuator 220 is illustrated. Hydraulic actuator 220 comprises actuator 30, low pressure accumulator subsystem 32, one or more routing valves 234, high pressure accumulator 36, flow control subsystem 38, pump 80, a plurality of check valves 240 and a pair of controlled restrictions 266.

Both pressure divider subsystems 34 and hydraulic switch valve 82 have been replaced by the combination of routing valves 234 and check valves 240 which select the highest pressure chamber between upper working chamber 46 and lower working chamber 48. The pair of controlled restrictions 266 act as a pressure divider subsystem similar to pressure divider subsystem 134 or pressure divider subsystem 34 discussed above. The function and operation of hydraulic actuator 220 is the same as discussed above for hydraulic actuator 120 and hydraulic actuator 20.

Figure 23:
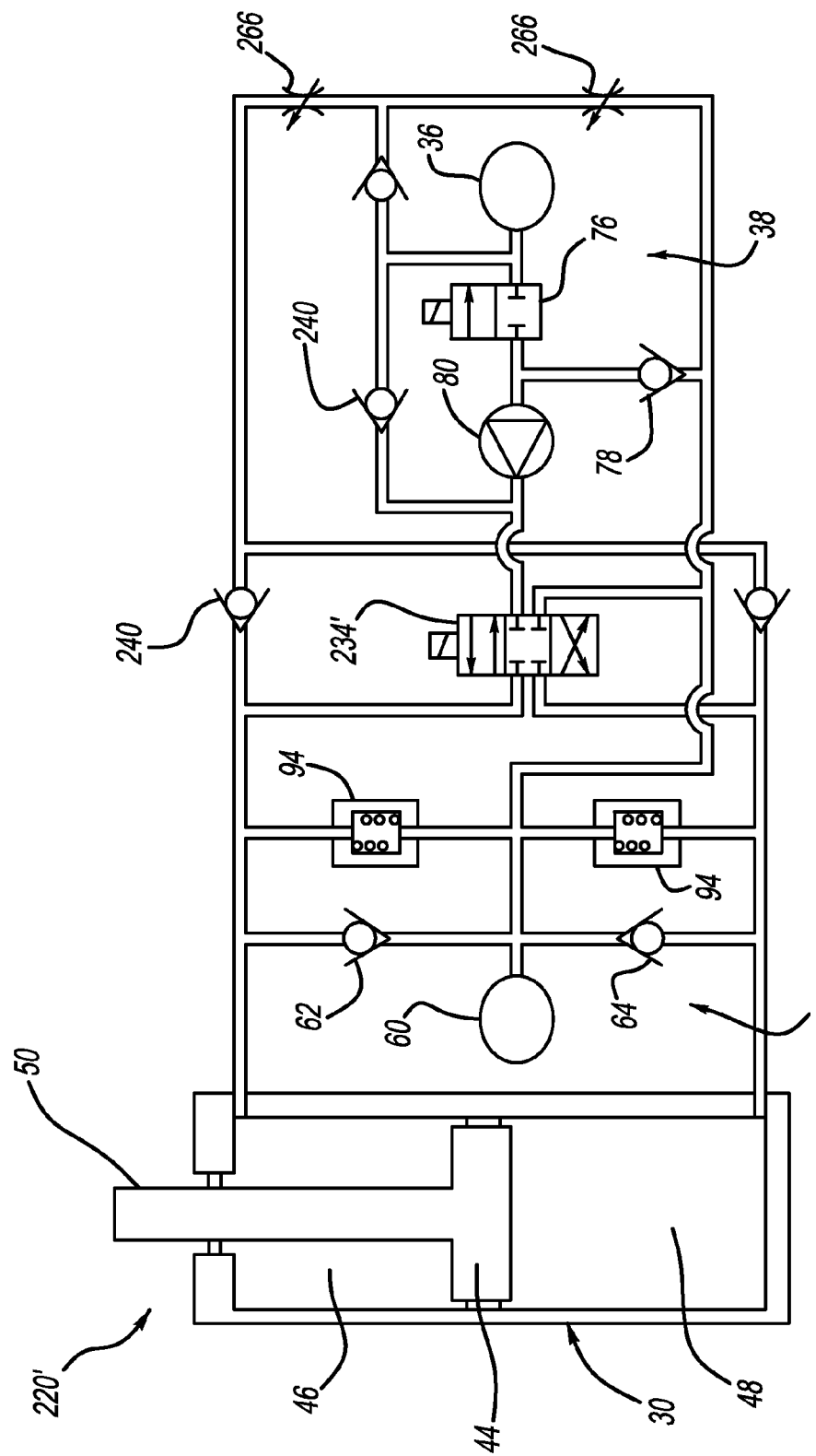
FIG. 23 is a schematic view of a hydraulic actuator illustrating alternative designs.

Referring now to FIG. 23, a hydraulic actuator 220' is illustrated. Hydraulic actuator 220' is the same as hydraulic actuator 220 shown in FIG. 22 except that the two routing valves 234 illustrated in FIG. 22 have been integrated into a single routing valve 234'. The discussion above relating to hydraulic actuator 220 applies to hydraulic actuator 220'. The pumping function related to high pressure accumulator 36 is implemented by this embodiment.

Figure 24:
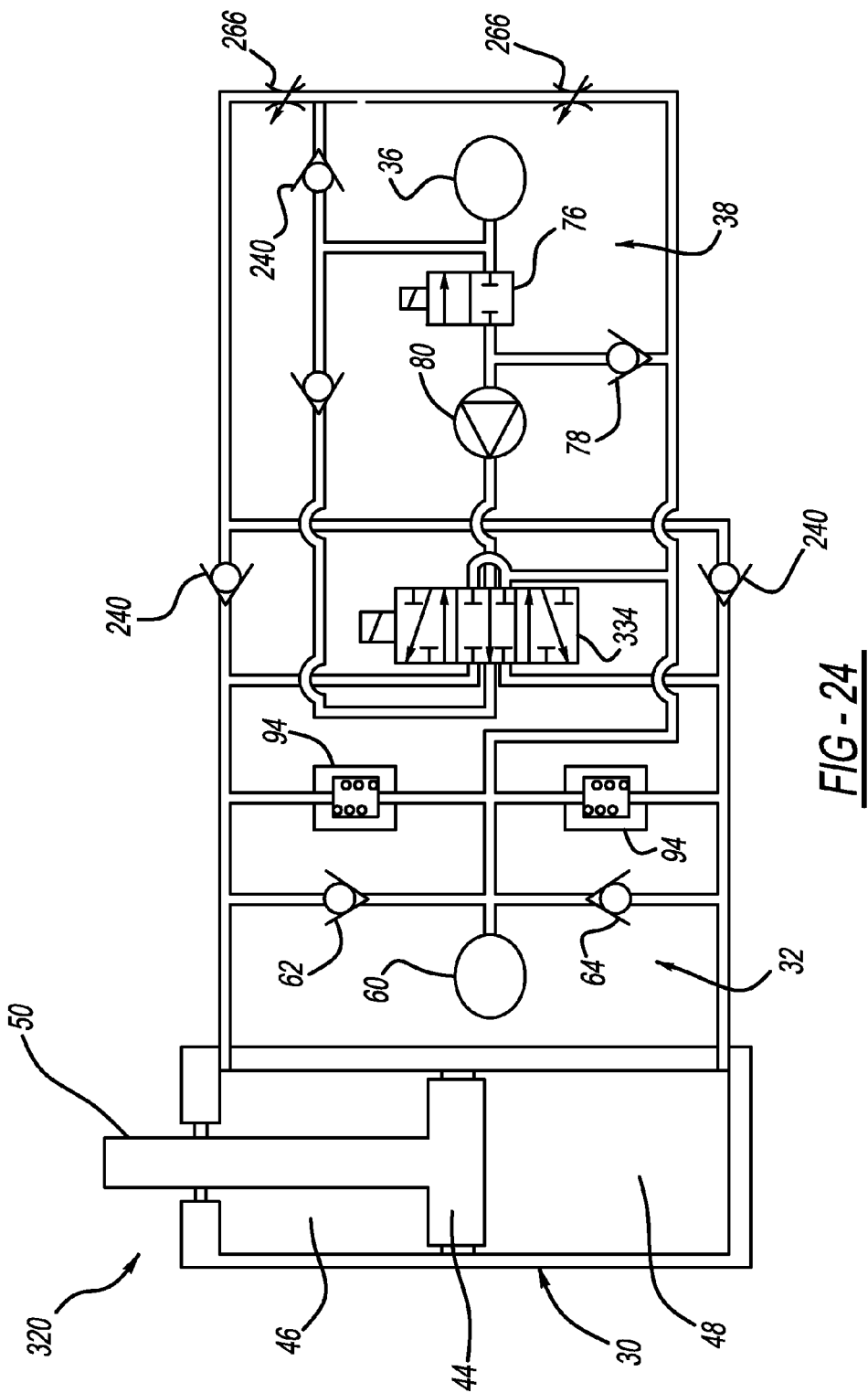
FIG. 24 is a schematic view of a hydraulic actuator illustrating alternative designs.

Referring now to FIG. 24, a hydraulic actuator 320 is illustrated. Hydraulic actuator 320 comprises actuator 30, low pressure accumulator subsystem 32, blow off valves 94, a routing valve 334, high pressure accumulator 36, flow control subsystem 38, the plurality of check valves 240, pump 80 and the pair of controlled restrictions 266. The pumping function related to high pressure accumulator 36 is implemented by this embodiment. The function and operation of hydraulic actuator 320 is the same as hydraulic actuator 220', hydraulic actuator 220, hydraulic actuator 120 and hydraulic actuator 20.

Figure 25:
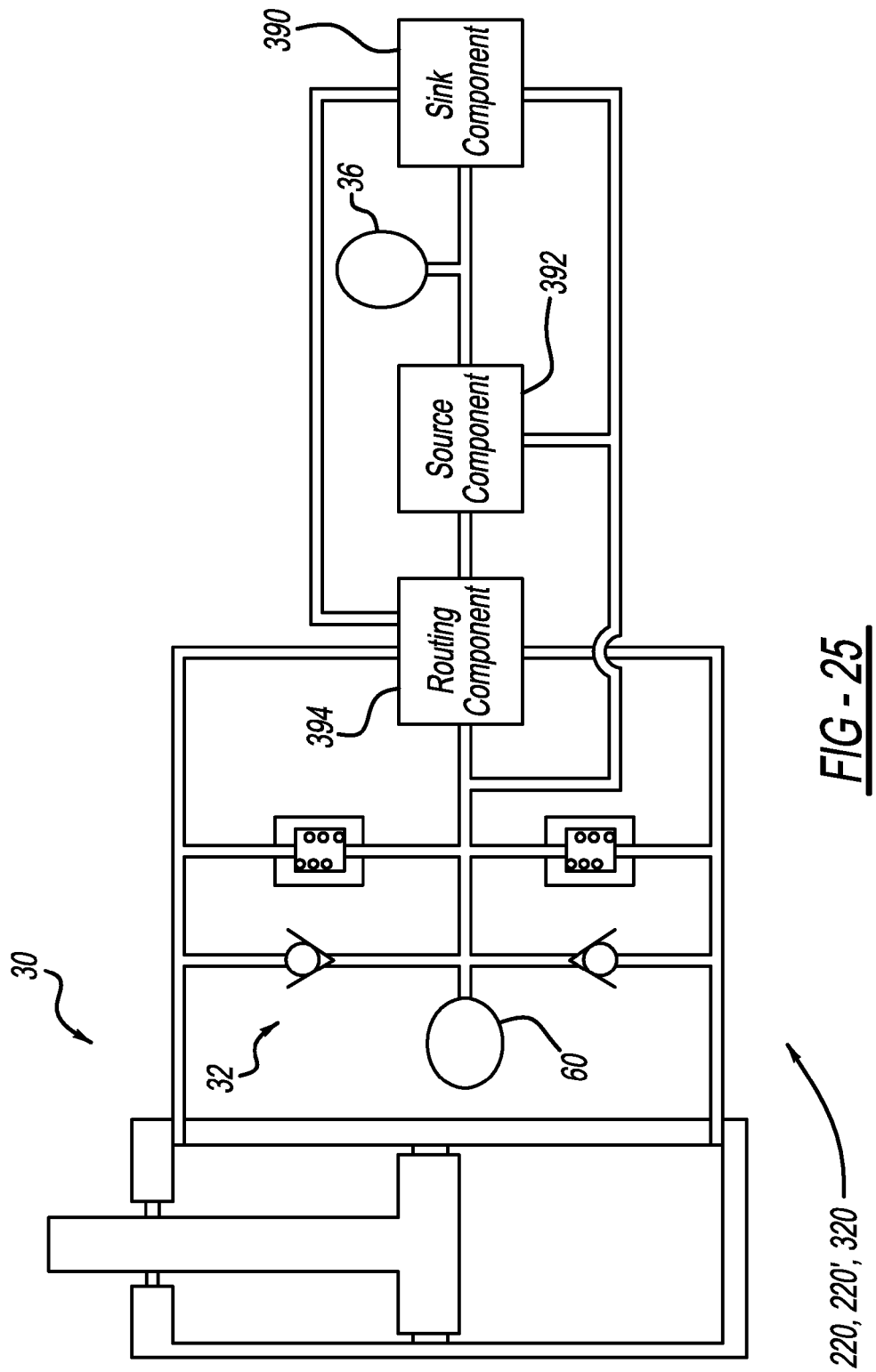
FIG. 25 is a schematic view of a hydraulic actuator in accordance with another embodiment of the present disclosure.

Referring now to FIG. 25, the various subsystems 32, 234, 234', 334, 36, 38 and 266 described for FIGS. 22-24 can be combined into many systems. As illustrated in FIG. 25, the general overlaying main system for hydraulic actuator 220, 220' and 320 comprises actuator 30, low pressure accumulator subsystem 32, one or more sink components 390, high pressure accumulator 36, one or more source components 392 and one or more routing components 394. FIGS. 22-24 illustrate various schematics of the combinations that are possible.

What is claimed is:
1. A hydraulic actuator assembly comprising:
an actuator;
a first sink subsystem fluidically connected to said actuator;
a second sink subsystem fluidically connected to said actuator;
a source subsystem fluidically connected to said actuator;
a low pressure accumulator fluidically connected to said actuator; and
a high pressure accumulator fluidically connected to said source subsystem; wherein
said actuator defines a pressure tube, an upper and a lower working chamber, said first sink system being fluidically connected directly to said upper working chamber, said second sink system being fluidically connected directly to said lower working chamber
said first sink subsystem includes a first controlled restriction in direct fluid communication with said upper working chamber; and
said second sink subsystem includes a second controlled restriction in direct fluid communication with said lower working chamber.

2. The hydraulic actuator according to claim 1, wherein said high pressure accumulator is fluidically connected to said first and second sink subsystems.

3. The hydraulic actuator according to claim 2, wherein said low pressure accumulator is fluidically connected to said first and second sink subsystems and said source subsystem.

4. The hydraulic actuator according to claim 1, wherein said low pressure accumulator is fluidically connected to said first and second sink subsystems and said source subsystem.

5. The hydraulic actuator according to claim 1, wherein said first sink subsystem includes a second controlled restriction.

6. The hydraulic actuator according to claim 1, wherein said first sink subsystem includes a third controlled restriction and said second sink subsystem includes a fourth controlled restriction.

7. The hydraulic actuator according to claim 6, wherein said first and third controlled restrictions are in series and said second and fourth controlled restrictions are in series.

8. The hydraulic actuator according to claim 6, wherein said first and third controlled restrictions are in parallel and said second and fourth controlled restrictions are in parallel.

9. The hydraulic actuator according to claim 1, wherein said source subsystem includes a fluid pump and a hydraulic switch valve.

10. The hydraulic actuator according to claim 9, further comprising a hydraulic valve disposed between said first and second pumps and said high pressure accumulator.

11. The hydraulic actuator according to claim 1, wherein the source subsystem includes a first and a second fluid pump.

12. The hydraulic actuator according to claim 11, further comprising a first hydraulic valve disposed between said first pump and said high pressure accumulator and a second hydraulic valve disposed between said second pump and said high pressure accumulator.

13. The hydraulic actuator according to claim 1, further comprising a first check valve prohibiting fluid flow from said upper working chamber to said low pressure accumulator and a second check valve prohibiting fluid flow from said lower working chamber to said low pressure accumulator.

14. The hydraulic actuator according to claim 13, wherein said high pressure accumulator is fluidically connected to said first and second sink subsystems and said hydraulic actuator assembly further comprises a first check valve prohibiting fluid flow from said high pressure accumulator to said first sink subsystem and a second check valve prohibiting fluid flow from said high pressure accumulator to said second sink subsystem.

15. The hydraulic actuator according to claim 1, wherein said high pressure accumulator is fluidically connected to said first and second sink subsystems and said hydraulic actuator assembly further comprises a first check valve prohibiting fluid flow from said high pressure accumulator to said first sink subsystem and a second check valve prohibiting fluid flow from said high pressure accumulator to said second sink subsystem.

* * * * *